(12) United States Patent
Rancourt et al.

(10) Patent No.: US 10,538,323 B2
(45) Date of Patent: Jan. 21, 2020

(54) TETHERED WING STRUCTURES COMPLEX FLIGHT PATH

(71) Applicants: David Rancourt, Grand-Mère (CA); Etienne Demers Bouchard, Gatineau (CA)

(72) Inventors: David Rancourt, Grand-Mère (CA); Etienne Demers Bouchard, Gatineau (CA)

( * ) Notice: Subject to any disclaimer, the term of this patent is extended or adjusted under 35 U.S.C. 154(b) by 553 days.

(21) Appl. No.: 15/345,376

(22) Filed: Nov. 7, 2016

(65) Prior Publication Data

US 2017/0129600 A1 May 11, 2017

Related U.S. Application Data

(60) Provisional application No. 62/251,762, filed on Nov. 6, 2015.

(51) Int. Cl.
| | |
|---|---|
| *B64C 39/02* | (2006.01) |
| *B64C 1/00* | (2006.01) |
| *B64C 19/02* | (2006.01) |
| *B64C 29/00* | (2006.01) |

(52) U.S. Cl.
CPC .............. *B64C 39/022* (2013.01); *B64C 1/00* (2013.01); *B64C 19/02* (2013.01); *B64C 29/0016* (2013.01); *B64C 39/024* (2013.01); *B64C 2201/042* (2013.01); *B64D 2221/00* (2013.01)

(58) Field of Classification Search
CPC ..... B64C 19/02; B64C 1/00; B64C 2201/042; B64C 2201/088; B64C 2201/10; B64C 2211/00; B64C 29/0016; B64C 39/022; B64C 39/024; B64D 2221/00; B64D 1/22; G05D 1/104
See application file for complete search history.

(56) References Cited

U.S. PATENT DOCUMENTS

| | | | | | |
|---|---|---|---|---|---|
| 1,181,784 | A | * | 5/1916 | McCurry | B64C 27/82 244/17.19 |
| 1,349,035 | A | * | 8/1920 | Alder | B60B 9/26 301/104 |
| 2,295,537 | A | * | 9/1942 | Anderson | B64D 1/22 258/1.4 |
| 2,298,912 | A | * | 10/1942 | Alabrune | B64D 1/22 244/1 R |
| 2,373,086 | A | * | 4/1945 | Alabrune | B64D 1/02 244/137.1 |
| 2,721,044 | A | * | 10/1955 | Young | B64C 37/02 244/2 |
| 2,730,398 | A | * | 1/1956 | Huested | B64D 1/22 244/118.5 |
| 3,008,665 | A | * | 11/1961 | Piasecki | B64B 1/00 244/2 |

(Continued)

*Primary Examiner* — Medhat Badawi

(57) ABSTRACT

A vertical liftoff aircrafts system includes a plurality of unmanned wing structures configured for collective vertical liftoff; a plurality of tethers respectively connected to the plurality of wing structures; and a fuselage including a connector thereon for mechanically connecting the plurality of tethers. The fuselage includes a power pack for powering the plurality of wing structures via the plurality of tethers, whereby the plurality of wing structures is operatively interconnected to the fuselage with the plurality of tethers for lifting the fuselage. A method and a kit thereof also are disclosed.

20 Claims, 38 Drawing Sheets

(56) References Cited

U.S. PATENT DOCUMENTS

| | | | | |
|---|---|---|---|---|
| 3,226,056 A * | 12/1965 | Holland, Jr. | | B64C 37/02 244/2 |
| 3,656,723 A * | 4/1972 | Piasecki | | B64C 27/12 244/2 |
| 3,756,543 A * | 9/1973 | Fowler | | G05D 1/0858 244/17.13 |
| 3,833,189 A * | 9/1974 | Fowler | | G05D 1/0858 244/177 |
| 3,838,836 A * | 10/1974 | Asseo | | G05D 1/0858 244/137.4 |
| 3,904,156 A * | 9/1975 | Smith | | B64D 1/22 244/118.1 |
| 3,946,971 A * | 3/1976 | Chadwick | | B64D 1/08 244/137.4 |
| 3,976,265 A * | 8/1976 | Doolittle | | B64B 1/00 244/2 |
| 4,046,339 A * | 9/1977 | Stancliffe | | B64C 25/36 244/103 R |
| 4,416,436 A * | 11/1983 | Wilson, Jr. | | B64D 1/22 244/137.1 |
| 4,591,112 A * | 5/1986 | Piasecki | | B64B 1/24 244/17.13 |
| 4,601,444 A * | 7/1986 | Lindenbaum | | B64B 1/24 244/2 |
| 5,082,205 A * | 1/1992 | Caufman | | B64C 37/02 244/2 |
| 5,465,925 A * | 11/1995 | Connolly | | B64D 1/12 244/137.1 |
| 7,714,457 B2 * | 5/2010 | Sankrithi | | F03D 3/067 290/43 |
| 7,967,238 B2 * | 6/2011 | Fuchs | | B64C 37/02 244/2 |
| 8,308,142 B1 * | 11/2012 | Olson | | B64C 37/02 244/137.1 |
| 8,370,003 B2 * | 2/2013 | So | | B64C 39/024 701/3 |
| 8,413,923 B2 * | 4/2013 | Brenner | | B64C 27/001 244/17.13 |
| 8,676,405 B2 * | 3/2014 | Kubik | | G05D 1/0858 701/1 |
| 8,936,212 B1 * | 1/2015 | Fu | | B64C 3/56 244/6 |
| 9,043,052 B2 * | 5/2015 | So | | G01C 23/00 701/3 |
| 9,174,732 B2 * | 11/2015 | Jensen | | B64C 39/022 |
| 9,205,922 B1 * | 12/2015 | Bouwer | | B64D 9/00 |
| 9,422,139 B1 * | 8/2016 | Bialkowski | | B64C 39/024 |
| 9,561,852 B1 * | 2/2017 | Beaman | | B64D 1/00 |
| 9,738,380 B2 * | 8/2017 | Claridge | | B64C 19/00 |
| 9,902,496 B2 * | 2/2018 | Bouwer | | F16F 1/40 |
| 9,958,876 B2 * | 5/2018 | Vander Lind | | G05D 1/104 |
| 10,017,245 B2 * | 7/2018 | Geise | | B64C 27/08 |
| 10,086,931 B2 * | 10/2018 | Reichert | | B64C 29/0025 |
| 10,173,775 B2 * | 1/2019 | Samaritano | | B64C 27/08 |
| 2002/0171008 A1 * | 11/2002 | Schuster | | B64D 1/22 244/118.1 |
| 2009/0127861 A1 * | 5/2009 | Sankrithi | | F03B 13/264 290/54 |
| 2011/0024555 A1 * | 2/2011 | Kuhn, Jr. | | B64C 29/0033 244/17.25 |
| 2014/0091172 A1 * | 4/2014 | Arlton | | B64C 27/14 244/17.23 |
| 2014/0205364 A1 * | 7/2014 | Bouwer | | F16F 1/40 403/120 |
| 2015/0120126 A1 * | 4/2015 | So | | G01C 23/00 701/26 |
| 2015/0329204 A1 * | 11/2015 | Nelson | | B64C 27/26 244/6 |
| 2016/0207368 A1 * | 7/2016 | Gaonjur | | B60F 5/02 |
| 2016/0207625 A1 * | 7/2016 | Judas | | B64C 29/0025 |
| 2016/0311526 A1 * | 10/2016 | Geise | | B64C 27/08 |
| 2016/0375982 A1 * | 12/2016 | Rifenburgh | | B64C 13/04 244/17.19 |
| 2017/0029105 A1 * | 2/2017 | Ferren | | B64C 39/022 |
| 2017/0043872 A1 * | 2/2017 | Whitaker | | B64D 1/18 |
| 2017/0127652 A1 * | 5/2017 | Shen | | A01K 15/021 |
| 2017/0129600 A1 * | 5/2017 | Rancourt | | B64C 39/022 |
| 2017/0158342 A1 * | 6/2017 | Ishii | | B64D 31/10 |
| 2017/0253333 A1 * | 9/2017 | Baudet | | B64C 39/024 |
| 2018/0319496 A1 * | 11/2018 | Zhang | | B64C 39/024 |
| 2019/0116758 A1 * | 4/2019 | Shen | | A01K 15/021 |

\* cited by examiner

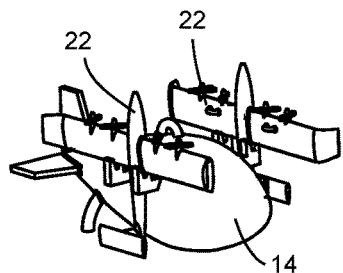
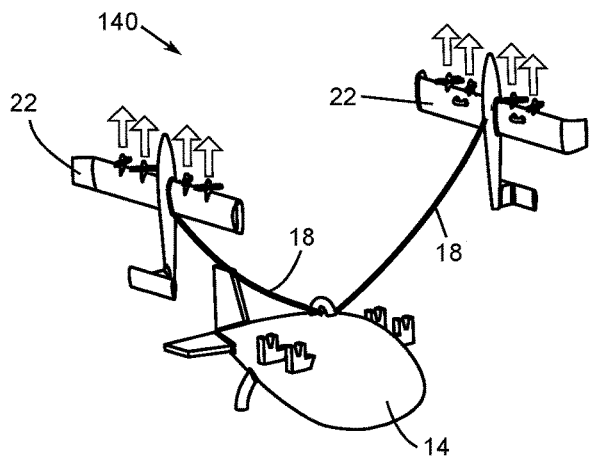
FIG. 6A  FIG. 6B
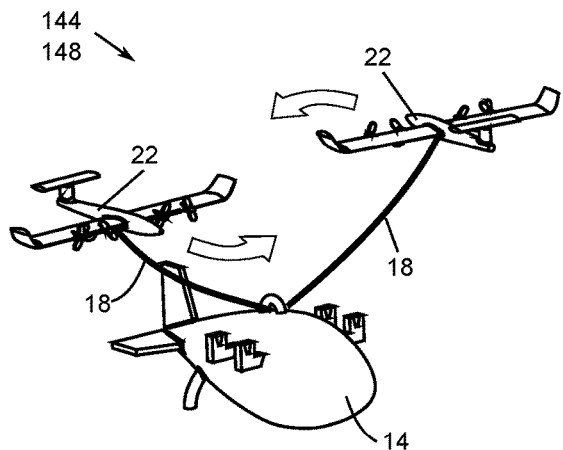
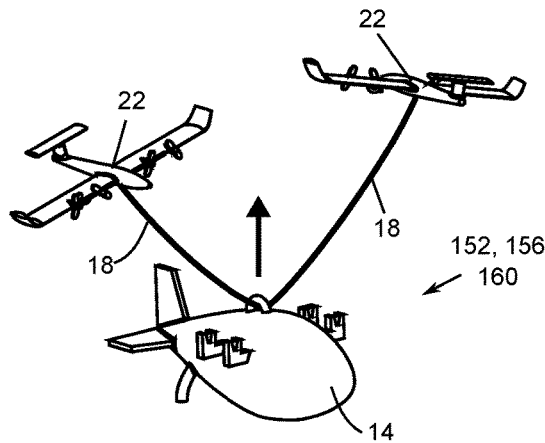
FIG. 6C  FIG. 6D
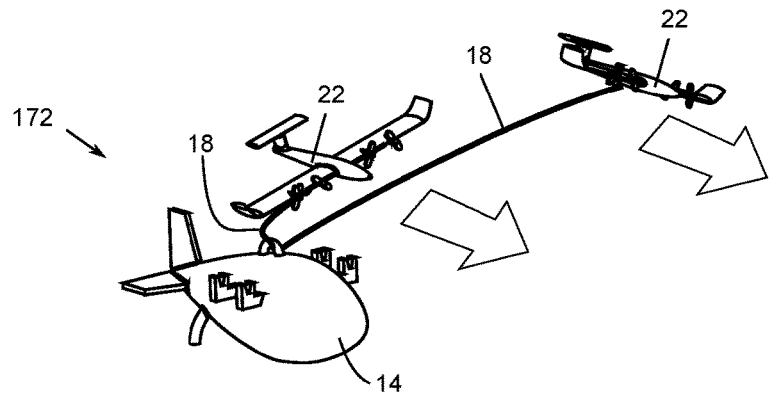
FIG. 6E

TETHERED WING STRUCTURES COMPLEX FLIGHT PATH

CROSS-REFERENCE

The present application is a U.S. nonprovisional application of, and claims priority under 35 U.S.C. § 119 to, U.S. provisional application 62/251,762, filed Nov. 6, 2015, titled VERTICAL TAKE-OFF, ELECTRIC RECONFIGURABLE LIFTING ROTOR, which '762 application is incorporated herein by reference in its entirety.

TECHNICAL FIELD

The present invention relates to tethered aircraft, and more particularly to a plurality of tethered wing structures using complex flight paths, for lifting cargo.

BACKGROUND

Helicopters currently provide the only practical means for vertical transport of cargo payloads and passengers. Alternatively, so called "long line" pick up techniques behind fixed-wing aircraft have been employed but only small amounts of weight may be picked up by any size aircraft. Although conventional helicopters show unequaled flight characteristics and fulfill the need of specific markets, their performance is limited and shows important shortcomings compared to fixed-wing aircraft. Helicopters operate in a very complex aerodynamic and structural environment. As a consequence, conventional helicopter configurations have the following limitations.

For a conventional helicopter, approximately 75% of its power requirement is from the power required to push air downward to create an upward lift, called induced power. The power requirement reduces for larger diameter rotors, as shown in the momentum equation used for conceptual sizing of helicopters where FM (factor of merit) is a correction factor with values between 0.7 and 0.85, ρ is the air density, and A is the area covered by the rotor ($\pi r^2$). In order to increase the thrust output of the rotor for a given power, the rotor size has to be increased. However, it has been seen that conventional helicopters have limited rotor size due to its complex aerodynamics and dynamic loading, and the increase in weight does not counterbalance the increase in efficiency.

$$P_{ind} = \frac{1}{FM}\sqrt{\frac{T^3}{2\rho A}} \qquad \text{Equation 1}$$

Helicopters have limited forward velocity in forward flight. A part of the rotor is operated with an increase in relative airspeed, also referred to as air velocity (advancing side), while the other half of the rotor sees a reduction in relative airspeed (retreating side). In the latter case, a part of the rotor blade operates in a "reverse flow region" where the wind originates from the trailing edge. On the advancing side, the increase in velocity near the rotor tip can lead to shock waves which lead to a reduction in efficiency and high noise levels. The cyclic variation in velocity combined with the requirement that the blades must generate approximately the same lift can lead to dynamic stalls, which also reduces the efficiency in forward flight. The parasitic drag of the fuselage (including the rotor hub) also contributes to the high-power requirement of helicopters at high speed.

The empty weight fraction is rarely below 0.45. The empty weight fraction is the ratio of the empty weight (vehicle weight with no payload, crew or fuel) to gross weight (maximum weight of vehicle at takeoff, with crew, payload and fuel). This ratio shows that a conventional helicopter has limited payload capacity due to the weight of the helicopter hardware required to perform the given task. Given the high fuel burn of conventional helicopters, a small cargo can be transported since a large part of the payload must be reserved for the fuel.

The possibility to perform vertical pickup and delivery of payloads using long tethers towed by fixed-wing airplanes has been proposed as early as 1931 by Beauford in U.S. Pat. No. 1,829,474. The early techniques assumed the use of a single aircraft with a long tether. A single airplane lowers a long tether and maintains a circular flight path. Under specific flight conditions, the tip of the tether becomes the apex of an inverted cone, allowing loading and unloading a payload from an airborne aircraft. A similar method was proposed in the late 1930's by Smith in U.S. Pat. No. 2,151,395 with the additional teaching that the tether could be reeled in from both the aircraft and the payload. The technique was shown experimentally by a missionary pilot, who used this technique to deliver small payloads in remote regions in South America. However, the performance of that system was quite limited since only one fixed-wing aircraft and tether was used.

The main motivation behind the concept of using fixed-wing aircraft to lift payloads in the 1940s was to achieve a higher payload lift capability than rotary wing aircraft, who were in their early days. The interest for a VTOL concept using tethered aircraft is not limited to a few individuals. Large corporations such as Lockheed Martin, in U.S. Pat. No. 4,416,436, and Northrop Grumman, in U.S. Pat. No. 5,722,618, also showed interest for this concept. Lockheed Martin (Lockheed-Georgia Company at the time) and Mississippi State University performed flight tests in 1983 using a Cessna Agwagon and a Boeing Stearman for the fixed-wing aircraft with positive results [Wilson 1983]. However, it was highlighted that the complexity to attach the tethers and the limitations to use conventional, manned aircraft can limit the applicability of the concept. Most of the novel concepts using tethered airplane to lift a payload show the following characteristics:

Use of conventional, manned airplane: Since manned aircraft are used, the airplanes must takeoff from a regular runway and then connect the tethers to the payload while they maintain a circular flight path. Therefore, the concept is not truly VTOL, but only the payload can lift vertically. Manned airplanes are also much heavier given an available power. The source of energy (usually jet fuel or avgas) is located in the airplane wings, onboard the airplanes. Such architecture reduces the thrust-to-weight ratio of the airplanes and limit their maneuverability. Therefore, the airplanes must take-off from a conventional runway and have limited turn radius. None of the configuration considers the use of electric power in a hybrid configuration to improve the overall efficiency of the system and increase its autonomy.

VTOL of the Payload, not the Airplanes: All the vehicle concepts presented in the literature review can perform VTOL of a payload, but no configuration allows for truly VTOL vehicle, where both the aircraft and its payload can take-off vertically.

Limited (Circular) Flight Path: The control methods previously proposed allows only for a circular flight path or a transition between hover (circular flight path) and high-speed flight where the aircraft are flying side by side. Conventional helicopters have six main control degrees of freedom: cyclic control (2), collective, tail rotor pitch, and two pseudo-controls (tilt and bank of the vehicle) provided that the rotor speed is constant. For a given flight condition, such as forward flight at a constant speed, there is only one setting of the controls (trim) that can be used to maintain that flight condition. For example, vertical motion is obtained by increasing the main rotor collective. More complex motions, such as a translation of the vehicle is obtained first with a tilt of the hub plane (initiated with a cyclic control input) and then with the tilt or pitch of the whole vehicle. Therefore, no optimization can be performed on how to trim the vehicle. The reconfigurable rotor VTOL concept shows a much larger number of control degrees of freedom since a large number of flight paths can lead to the same airspeed of the system. A reduction in power requirement throughout the flight envelope (Any condition that the aircraft can fly in (payload weight, altitude, airspeed, air density . . . ). A reduction in power requirement would lead be a more efficient system with more payload capacity, higher endurance and range, faster system airspeed, and reduced operating cost. The use of circular flight paths can be seen as the most obvious choice based on the paradigm of conventional helicopter rotors. Previous research on tethered payload towed by circling aircraft also used this approach given the simplicity to fly such flight path by manned aircraft. However, in the present situation, much more advanced flight path trajectories and airspeed can be desirable to reduce the power required as a function of the flight speed.

In previous proposed concept ideas, such as taught in U.S. Pat. No. 4,416,436, the transition starts with the fuselage with zero airspeed, and is accelerated to the critical airspeed in approximately one revolution of the aircraft. This method of accelerating the fuselage is not possible when the weight of the fuselage becomes large compared to the weight of the aircraft because a lot of kinetic energy coming from the aircraft has to be transmitted to the fuselage in a short amount of time, which would cause a very large power requirement. The transition to the fast flight, where the multiple aircraft fly side-by-side at high speed is a critical aspect of the flight. The transition can only occur when the whole system goes faster than the critical airspeed: the speed at which the aircraft can sustain the weight of the fuselage (stall speed). It can be desirable to use an alternate flight path to accelerate the cargo load gradually.

A significant power loss mechanism in hover is the induced power. For a conventional helicopter, approximately 75% of its power requirement is from the power required to push air downward to create an upward lift, called induced power. The power requirement reduces for larger diameter rotors, as shown in the momentum equation used for conceptual sizing of helicopters:

$$P_{ind} = \frac{1}{FM} \sqrt{\frac{T^3}{2\rho A}} \quad \text{Equation 2}$$

Where FM (factor of merit) is a correction factor with values between 0.7 and 0.85, $\rho$ is the air density, and A is the area covered by the rotor ($\pi r^2$).

The forward flight phase is defined as a flight condition in which the fuselage airspeed is non-zero and the tethered UAV are still flying along a periodic flight path with respect to the fuselage reference location. Two main problems arise in this flight phase: wake interaction between the aircraft in forward flight, which can be minimized with unconventional flight paths; and increase in tethered UAV and tether losses which can be minimized by performing load transfer between the UAV. All concepts assume that the tethered UAV cannot fly along circular flight path while moving the fuselage. They assume that the system is only in hover or in high-speed flight, but it cannot operate in-between. Tethered aircraft concepts to lift payloads traditionally do not operate in the "slow flight regime", where the payload velocity is too slow to allow the tethered aircraft to fly "side-by-side" as if they were towing the fuselage. They either perform circular flight path (in hover) followed by a rapid transition to a "linear flight path", where the aircraft fly side by side. In other words, the system cannot fly "slow".

Undesirable wake interaction is obtained when one tethered UAV encounter or fly near the wake from another UAV or its own wake after one rotor revolution. In forward flight, for circular flight path, the tethered UAV encounter the wake from the other UAV which increases the power requirement.

In some applications, it can be desirable to limit the motion of the fuselage. Among the configurations, it can be appropriate to be as close to zero motion of the fuselage. Also, dynamic motion can lead to unstable behavior of the system. Consequently, it is important to include means to control the fuselage motion by including thrusters on the fuselage.

Complex flight paths can lead to non-constant electrical power requirement. This is due to the non-constant velocity, and requirement in thrust of each aircraft. The power required for a non-limiting forward flight case example is shown in FIG. 29. It is therefore desirable to limit the drawbacks of the non-constant required power.

Accordingly, there is a need for an improved tethered winged structure for lifting and transporting cargo that is more efficient, can be easily installed and economically manufactured.

SUMMARY

It is one aspect of the present invention to alleviate one or more of the drawbacks of the background art by addressing one or more of the existing needs in the art. Accordingly, embodiments of this invention provide an improved tethered aircraft system over the existing art.

Embodiments of the invention describe means for lifting a fuselage with a plurality of tethered winged structures. Lifting the fuselage is made more efficiently with embodiments described therein.

The system, in at least one embodiment thereof, is comprising a plurality of flying winged structures, that can be electric powered Unmanned Aerial Vehicles (UAV) that are tethered to a fuselage containing a cargo payload. The use of tethered aircraft gives a lot of flexibility to the system because the aircrafts are independent of each other's and can perform advanced flight paths. This allows the system to change its flight characteristics depending on the operating conditions (velocity, altitude, fuselage weight, wind gusts, etc.).

In at least an embodiment thereof, an electrical power pack is included in the fuselage, and electrical power is transferred to the aircraft through conductors in the tethers. This allows the aircraft to be as light as possible as no power source is stored aboard. Consequently, they can perform vertical takeoff and landing in the tail sitting configuration using only the thrust of the propellers.

In accordance with at least one embodiment, the fuselage can be linked to a ground station by an additional tether. This tether can be used to send electrical power to and from the fuselage and send information to the control unit.

In accordance with at least one embodiment, the tether length can be adjusted throughout the different phases of flight by a reel in/reel out mechanism located on the aircraft or on the fuselage.

In accordance with at least one embodiment, the flight phases are as follows. The takeoff phase generally starts with the aircraft on the ground or on the fuselage. The aircraft take off vertically using the power provided through the tether. At this point the tether is not necessarily under tension and consequently the fuselage is not airborne yet. Once the aircraft reach the specified altitude, the system shifts to the hover phase. The hovering phase is generally described by a close-to-circular motion of the aircraft over the fuselage. That flight path enables the aircraft to fly at a high speed and to generate enough lift to lift the fuselage off the ground. The slow flight phase is generally described by a close-to-circular motion of the aircraft over the fuselage. However, the aircraft can modify their circular motion in order to induce periodic variations of tension to move the fuselage in one direction and the fuselage motion can be damped by the use of thrusters. The fast flight phase is the final phase of flight generally described by the aircraft transitioning from a circular path to a linear path. The aircraft can be arranged in formation flight and the tether length can be adjusted to provide optimal flight conditions. Depending on the desired mission, the system does not have to perform all flight phases. In some cases, hover may be the only required phase for example. Finally, all those phases of flight and transitions can be reversed for landing. The different phases of flight allow to operate at a minimum power required depending on the forward flight airspeed.

One object of our work, in accordance with at least one embodiment thereof, provides a non-circular flight path with varying flight speed.

One object of our work, in accordance with at least one embodiment thereof, provides an elliptical flight path, or other non-circular complex and periodic flight paths One object of our work, in accordance with at least one embodiment thereof, provide a hovering epitrochoid flight path that can be also described as an elliptical non-overlapping flight path.

One object of our work, in accordance with at least one embodiment thereof, provide a non-circular slow flight that can include an elliptical flight path with tilt of the whole flight path and speed variations, used separately or in combination thereof.

One object of our work, in accordance with at least one embodiment thereof, provides a light tethered aircraft since the battery, or the energy source, is located in the fuselage section instead of the tethered aircraft.

One object of our work, in accordance with at least one embodiment thereof, provides an unmanned aircraft which allows much more complex flight path at high load factors maneuvers.

One object of our work, in accordance with at least one embodiment thereof, provides the use of electric propulsion on those tethered aircrafts to allow rapid changes in the power requirement.

One object of our work, in accordance with at least one embodiment thereof, provides tension variations in the different tethers when the plurality of wing structures is lifting a fuselage along the flight path.

One object of our work, in accordance with at least one embodiment thereof, provides tilting of the whole flight path about the fuselage location.

One object of our work, in accordance with at least one embodiment thereof, provides a method for transitioning to fast flight. In order to transition to the high-speed flight, a methodology that uses the non-circular flight path is required to accelerate the payload gradually with minimal power requirement.

One object of our work, in accordance with at least one embodiment thereof, provides a method of minimizing the induced power by increasing the equivalent disk area with non-circular flight path.

One object of our work, in accordance with at least one embodiment thereof, provides a non-axisymmetric flight condition for the tethered wing structure.

One object of our work, in accordance with at least one embodiment thereof, provides a control module for controlling a dynamic behavior of the fuselage both in translation and in rotation resulting from wind gusts or rapid maneuver from the tethered aircraft.

One object of our work, in accordance with at least one embodiment thereof, provides a tethered aircraft flight path that is tilted forward, which increases the distance between the wake behind the tethered aircraft.

One object of our work, in accordance with at least one embodiment thereof, provides a tethered aircraft flight path that is tilted sideways and varying the tethered flight path speed when the system is in forward flight to minimize the power losses.

One object of our work, in accordance with at least one embodiment thereof, provides external aerodynamic forces on the fuselage in order to limit the motion of the fuselage and mitigate the negative impacts of unsteady forces. This can be realized by installing thrusters in the form of, but not limited to, propellers or ducted fans on the side of the payload. Because they are directly mounted on the fuselage, their control authority is greater than the tethered aircraft forces and can lead to quicker response and better control.

One object of our work, in accordance with at least one embodiment thereof, provides batteries and/or electrical capacitors can be included in the fuselage, and/or in the aircraft in order to reduce the drawback from unsteady power requirements from the aircraft to the power pack and provides a backup power source in case of a failure of the power pack or the tether.

One object of our work, in accordance with at least one embodiment thereof, provides a remote control unit capable of sending command to the vehicle control system.

One object of our work, in accordance with at least one embodiment thereof, provides a vertical liftoff aircrafts system comprising a plurality of unmanned wing structures configured for collective vertical liftoff, a plurality of tethers respectively connected to the plurality of wing structures and a fuselage including a connector thereon for mechanically connecting the plurality of tethers, the fuselage including a power pack for powering the plurality of wing structures via the plurality of tethers, whereby the plurality of wing structures is operatively interconnected to the fuselage with the plurality of tethers for lifting the fuselage.

One other object of our work, in accordance with at least one embodiment thereof, provides a method of operating a vertical liftoff aircrafts system, the vertical liftoff aircrafts system comprising a plurality of unmanned wing structures configured for collective vertical liftoff, a plurality of tethers respectively connected to the plurality of wing structures and a fuselage including a connector thereon for mechanically connecting the plurality of tethers, the fuselage including a power pack for powering the plurality of wing structures via the plurality of tethers, whereby the plurality of wing structures is operatively interconnected to the fuselage with the plurality of tethers for lifting the fuselage, the method comprising vertically disposing the plurality of wing structures, liftoff the plurality of wing structures in a generally vertical direction, flying the plurality of wing structures along a flight path, periodically changing a flight velocity vector of the flight path and lifting airborne the fuselage.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

These and other features of that described herein will become more apparent from the following description in which reference is made to the appended drawings herein.

FIG. 6A illustrates, in accordance with at least one embodiment of the invention, a perspective with of the tethered aircraft system in a first configuration.

FIG. 6B illustrates, in accordance with at least one embodiment of the invention, a perspective with of the tethered aircraft system in a second configuration.

FIG. 6C illustrates, in accordance with at least one embodiment of the invention, a perspective with of the tethered aircraft system in a third configuration.

FIG. 6D illustrates, in accordance with at least one embodiment of the invention, a perspective with of the tethered aircraft system in a fourth configuration.

FIG. 6E illustrates, in accordance with at least one embodiment of the invention, a perspective with of the tethered aircraft system in a fifth configuration.

DETAILED DESCRIPTION

Figure 1:
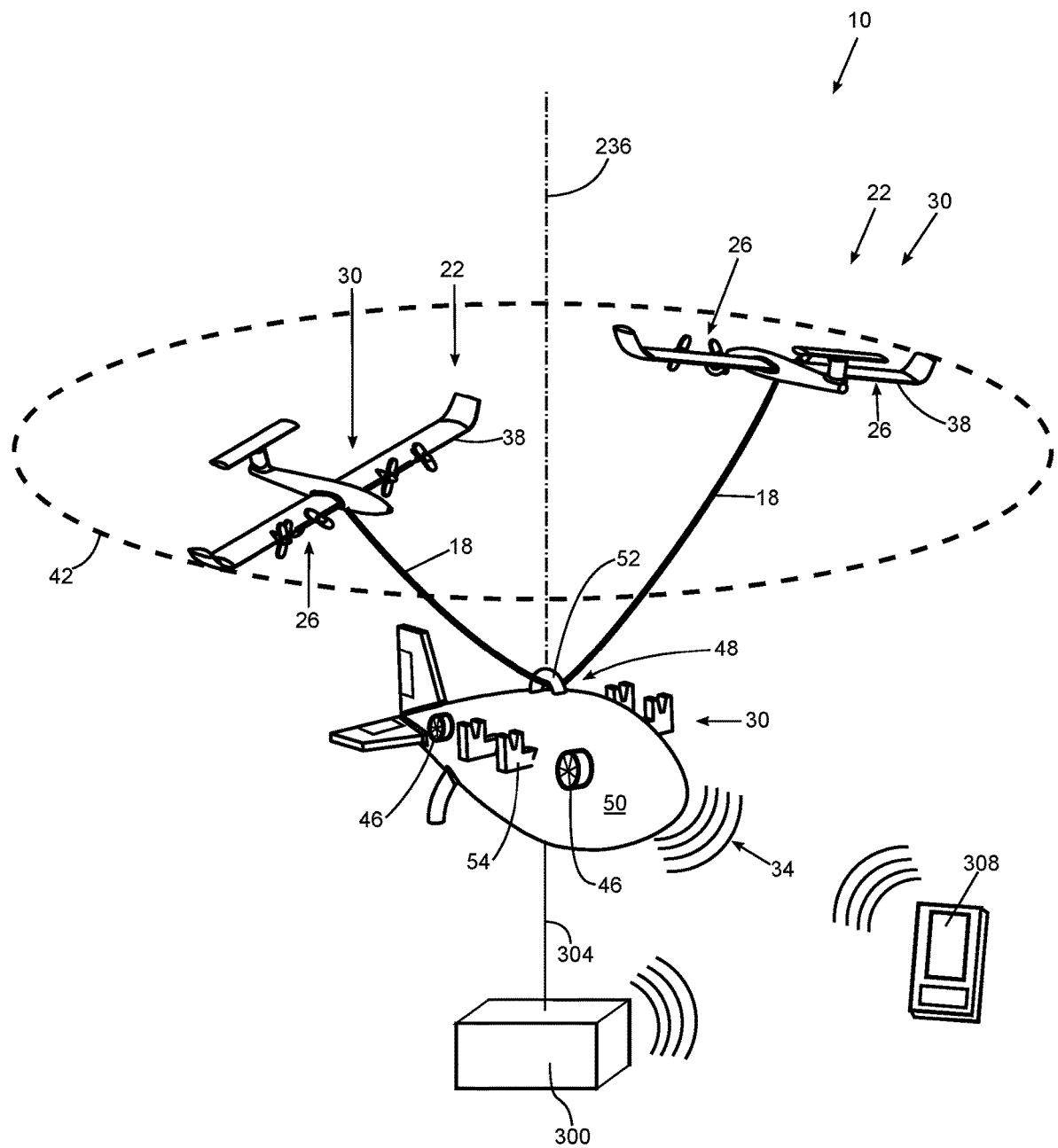
FIG. 1 illustrates, in accordance with at least one embodiment of the invention, an isometric view of a tethered aircraft system.

Preferred embodiments of the present invention are described below with reference to the drawings. The invention can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A tethered aircraft system 10 for lifting cargo with a fuselage 14 is discussed hereinafter in reference with the figures. The tethered aircraft system 10 illustrated in FIG. 1 comprises a fuselage 14, a tether 18, a wing structure 22 with propeller system(s) 26 and automatic control system(s) 30. The wing structure 22 is capable of flying to a low altitude or high altitude using the propeller system(s) 26 in propulsion mode in order to propel the tethered aircraft system 10. The wing structure 22 is connected to a fuselage 50 adapted to transport cargo 14 via the tether 18 preferably connected to the fuselage 14 with a gimbal allowing rotation of the tether 18 about the fuselage 14, and delivers the power generated by a power pack 34 in the fuselage 50, as provided in at least one embodiment, through the tether 18. In some embodiments, measurements of the angles between the fuselage 50 and the tether 18 and the angles between the wing 38 and the tether 18 are used to enable the control system 30 to achieve a desired flight path 234. In some embodiments, measurements of tether tension are used to maintain a desired tether tension. The power pack 34 located in the fuselage 50 allows for the wing structure 22 to be as light as possible, as no energy is stored onboard. The fact that the wing structures 22 are very light is an enabler to perform the non-conventional flight maneuvers, including but not limited to non-circular flight path. First, it allows the wing structure 22 to perform vertical takeoff/liftoff with only the thrust of their propellers 26. Also, because the wing structures 22 are light, accelerating does not require a lot of power. Consequently, this allow the wing structures 22 to perform efficiently the different aspect of the different flight paths.

Still in reference with FIG. 1, the tether 18 is used to mechanically support the fuselage 50, transmit control information and transmit power from the fuselage 50 to the wing structure 22. It can be appreciated there is a plurality, a pair, three or more wing structures 22 flying in a circular path 42 in generally opposed positions to lift and transport the cargo 14 with the fuselage 50. One can also appreciate the fuselage 50 includes optional thrusters 46 interconnected with a fuselage 50. Optional wing structure 22 supports 54 are provided by the fuselage 50 to maintain the wing structures 22 in a substantially vertical launch position. The tether attachment point on the fuselage can be made through one or a plurality of combined gimbal mounts to decouple the circular motion of the wing structure 22 from the fuselage 50.

Figure 2:
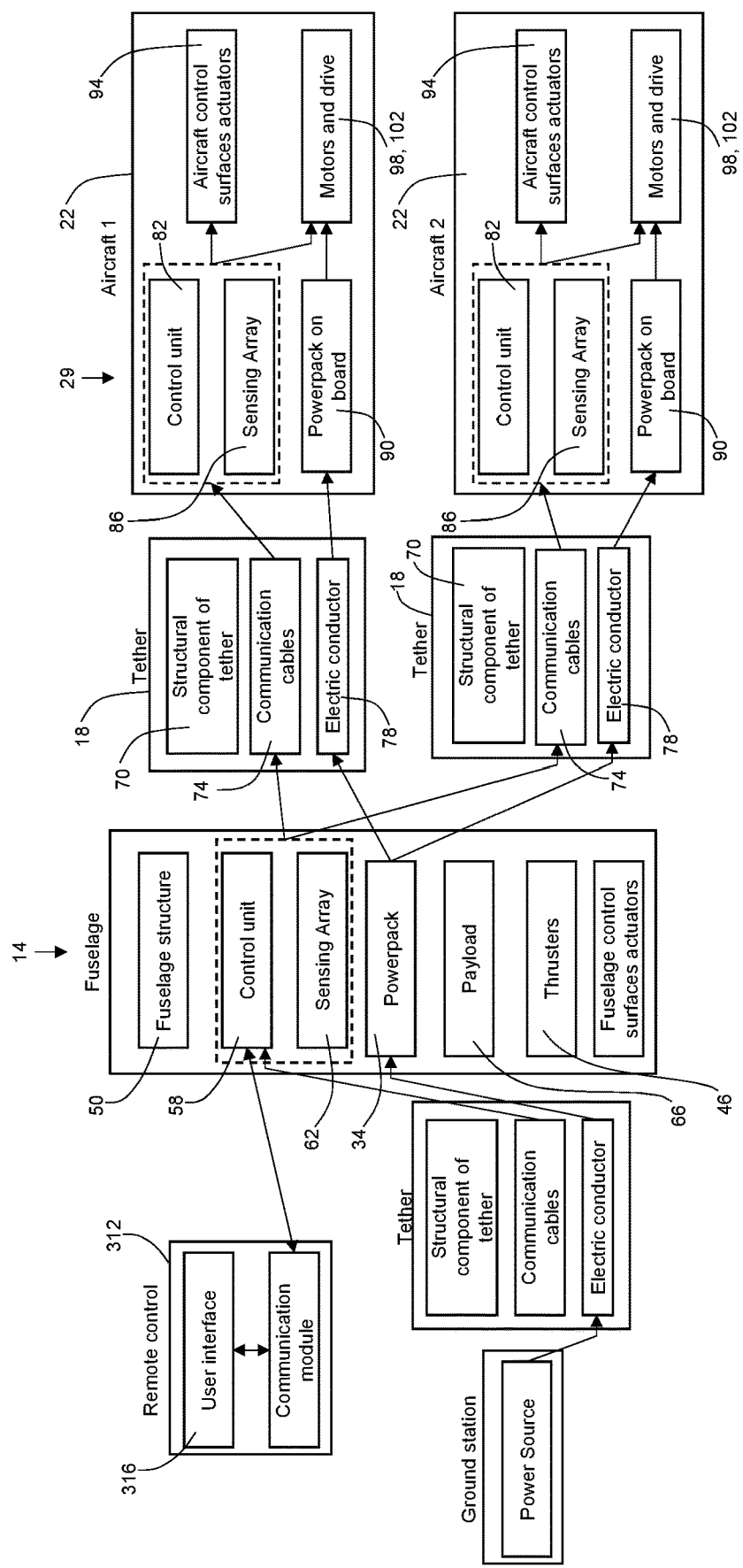
FIG. 2 illustrates, in accordance with at least one embodiment of the invention, a block diagram of a tethered aircraft system.

FIG. 2 depicts system components of the fuselage 50, the tether 18 and the wing structures 22. The fuselage 50, in accordance with embodiments of the invention, includes the fuselage 50, a control unit 58, sensing array 62 capable of preprocessing data and instructions, the power pack 34, the payload 66 and the thrusters 46. The system components of the fuselage 50 are operatively connected to the tether 18. The tether 18 includes a structural component 70 that is adapted to sustain mechanical traction for lifting the fuselage 50, communication cables 74 for transmitting control information between the fuselage 50 and the wing structure 22 and electric conductor(s) 78 for transmitting power from the fuselage 50 to the wing structures 22 when the power pack 34 is located in the cargo 14. The wing structures 22 individually or collectively include a control unit 82, a sensing array 86, a power pack 90 (in embodiments where the wing structure 22 houses the power pack 90), a plurality of aircraft control surfaces actuators 94 and motors 98 and interconnected drives 102 for propelling the wing structure 22.

Sensor arrays 62, 86 are installed in the fuselage 50 and/or in each wing structure 22. The sensor arrays 62, 86 are a set of sensors that are used to sense many aspects of the flight such as but not limited to fuselage 50 airspeed, position of the wing structure 22, velocity of the wing structure 22, tether 18 tension, tether 18 orientation.

The use of differential Global Navigation Satellite System (GNSS) can also be used to get the relative position of the wing structure 22 and fuselage 50. Processing/control units 58, 82 are installed on each wing structure 22 and in the fuselage 50 and manage the information of the sensors. The processing/control units 58, 82 communicate with each other and coordinate the efforts of each physical system (wing structure 22 and fuselage 50) to operate at the optimal flight path and limit the fuselage 50 motion.

In various embodiments, other sensors that measure position, speed, and/or orientation are used to enable the control system 30 to control the wing structure 22 including, for example, a global navigation satellite system, an inertial measurement unit sensor, a radar position sensor, a radio frequency time of arrival sensor, an optical sensor, a wind speed sensor, a wind direction sensor, a tether tension sensor, a winch speed sensor, a power output sensor, an air pressure sensor, a temperature sensor, a line angle sensor, a light sensor, a light detection and ranging (LIDAR) system, a visible light sensor, a radio wave interferometric sensor, a radio detection and ranging (RADAR), a microwave sensor, an ultrasonic sensor, a sonar mapper, or any other appropriate sensor.

The fuselage 50 can also be optionally connected to a ground station 300 by a tether 304. The ground station 300 can provide electrical power through the tether 304 with yields to very long endurance flight of the system. Information. Data and control instructions can also be sent through the tether 304.

Figure 3:
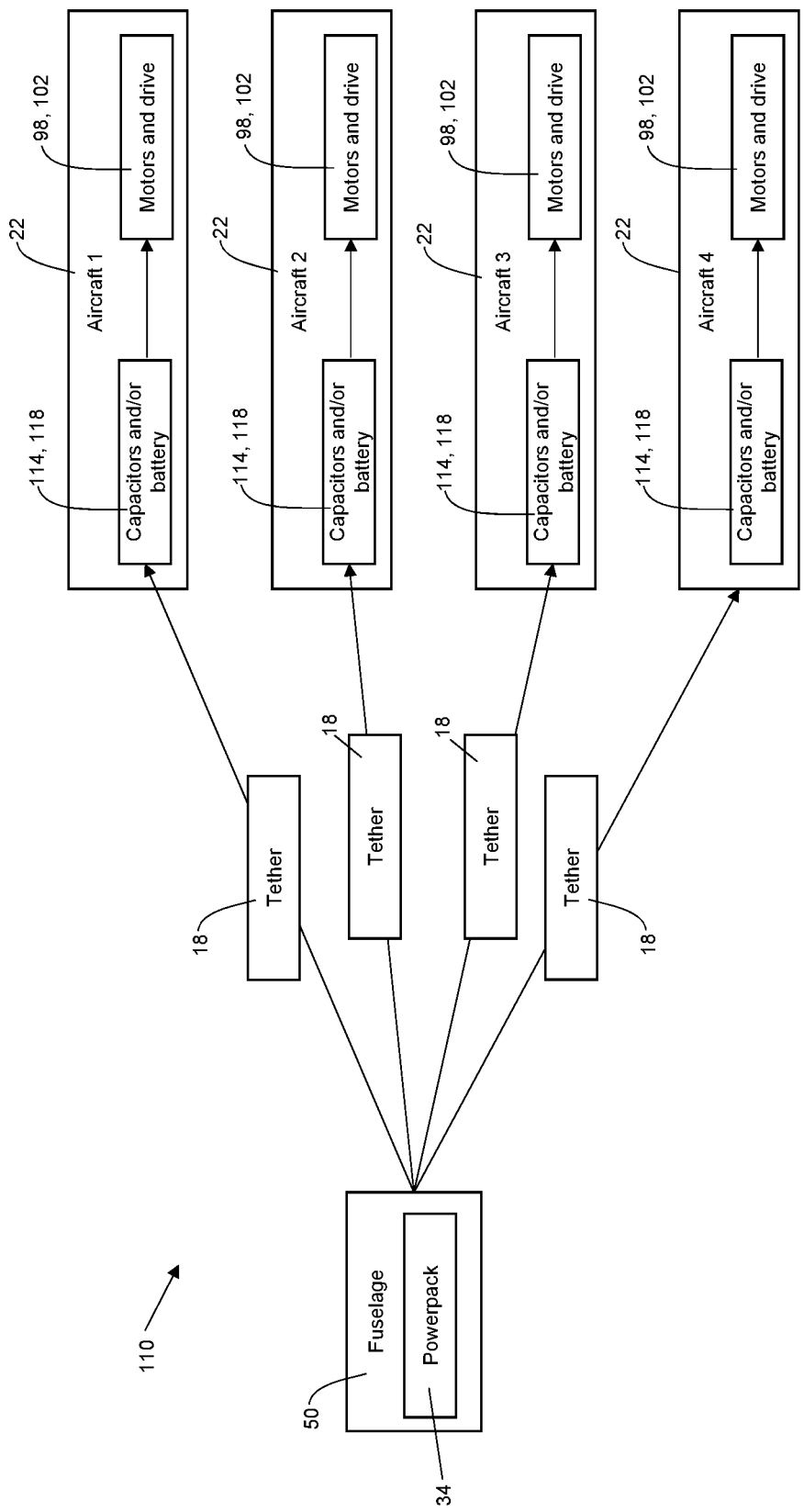
FIG. 3 illustrates, in accordance with at least one embodiment of the invention, a block diagram of a tethered aircraft system.

FIG. 3 illustrates with more details an exemplary system of a fuselage-powered configuration 110. The cargo-powered configuration 110 locate the power pack in the fuselage 50 of the fuselage 50. The tether 18 is operatively connected to the wing structures 22 to power the wing structures 22 via an optional capacitor 114 and/or a battery 118 and propel the wing structure 22 with the motors 98 and interconnected drives 102. The various controls for managing the tethered aircraft system 10 with a remote control 308 that can operate with a cable or wirelessly.

Figure 4:
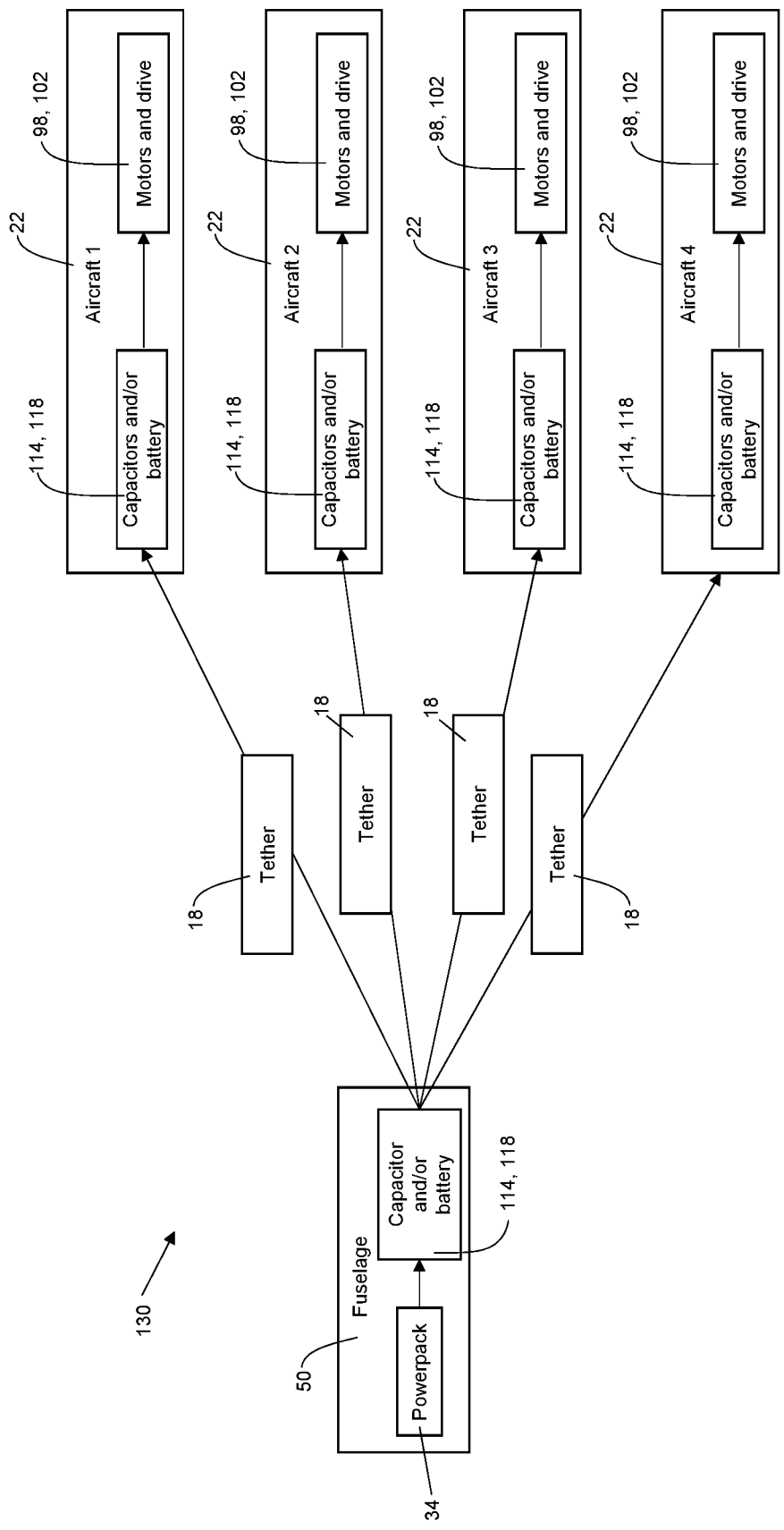
FIG. 4 illustrates, in accordance with at least one embodiment of the invention, a block diagram of a tethered aircraft system.

FIG. 4 illustrates with more details an alternative exemplary system of a cargo-powered configuration 110 with capacitor 114 and/or battery 118 located in the fuselage 50. The alternate cargo-powered configuration 130 locates the power pack 34 in the fuselage 50. This configuration is desirable to reduce the weight of the wing structure 22. The tether 18 is operatively connected to the wing structures 22 to power the wing structures 22 via a capacitor 114 and/or a battery 118 and propel the wing structure 22 with the motors 98 and interconnected drives 102.

Figure 5:
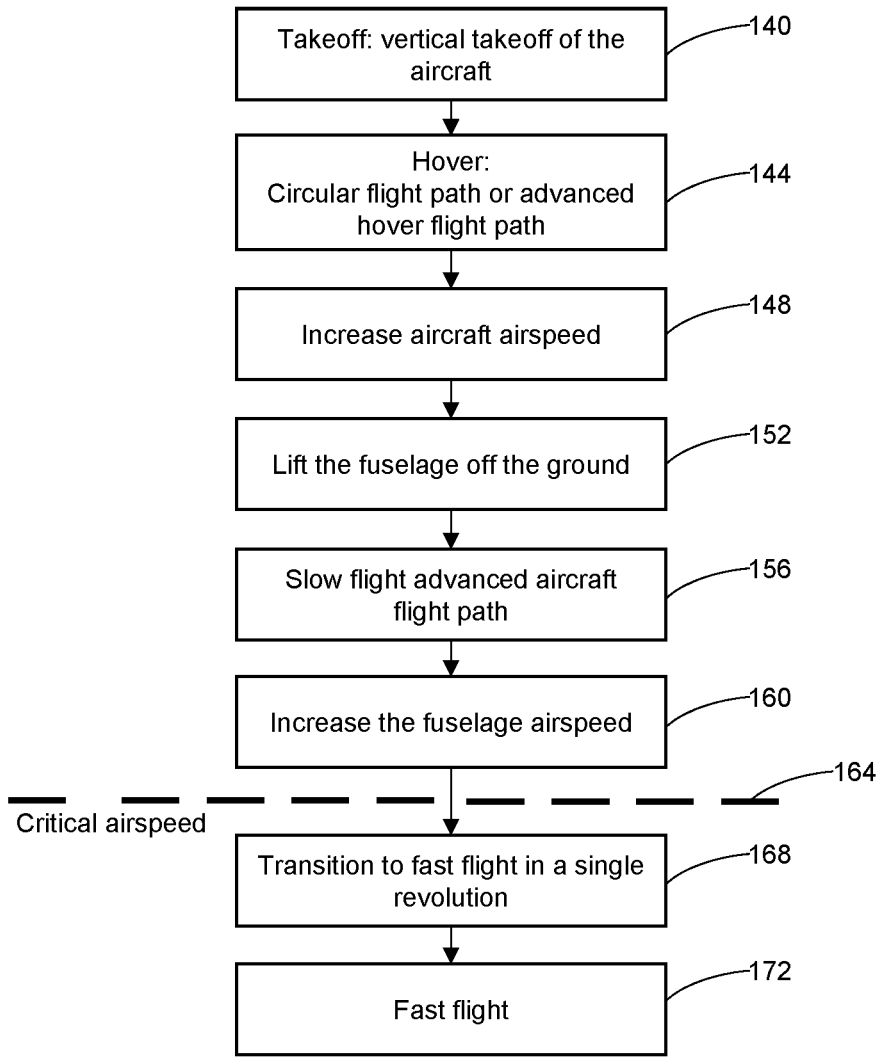
FIG. 5 illustrates, in accordance with at least one embodiment of the invention, a flow chart exemplifying a takeoff of the tethered aircraft system and transition to the different flight modes.

Moving now to FIG. 5 illustrating a flow chart of a typical series of steps to get the wing structure 22 airborne to lift and move the fuselage 50 with the wing structures 22. FIG. 5 can be read in light of FIGS. 6A-6E to better appreciate the various steps performed by the wing structures 22 and the fuselage 50. First, the wing structures 22 are ready for a vertical takeoff and are vertically propelled 140 to get airborne without lifting the fuselage 50. Then the wing structures 22 are hovering in a substantially circular flight path 144 that is going to be discussed below in greater details, the wing structures 22 are increasing airspeed 148 and are lifting the fuselage 50 with the cargo 14 off the ground 152. The pair of wing structure 22, that could be alternatively more than two wing structures 22 without departing from the scope of the present invention, are evolving in slow flight advanced aircraft flight path 156 that is also going to be discussed below in greater details, to increase the fuselage 50 airspeed 160 until critical airspeed is reached. Critical airspeed 164 is referring to minimum crosswind airspeed on the wings of the wing structure 22 to achieve linear flight and benefit from lift force from the wings. Transition to fast flight 168 is accomplished when critical airspeed is reached 164 to get to fast flight 172.

Figure 7:
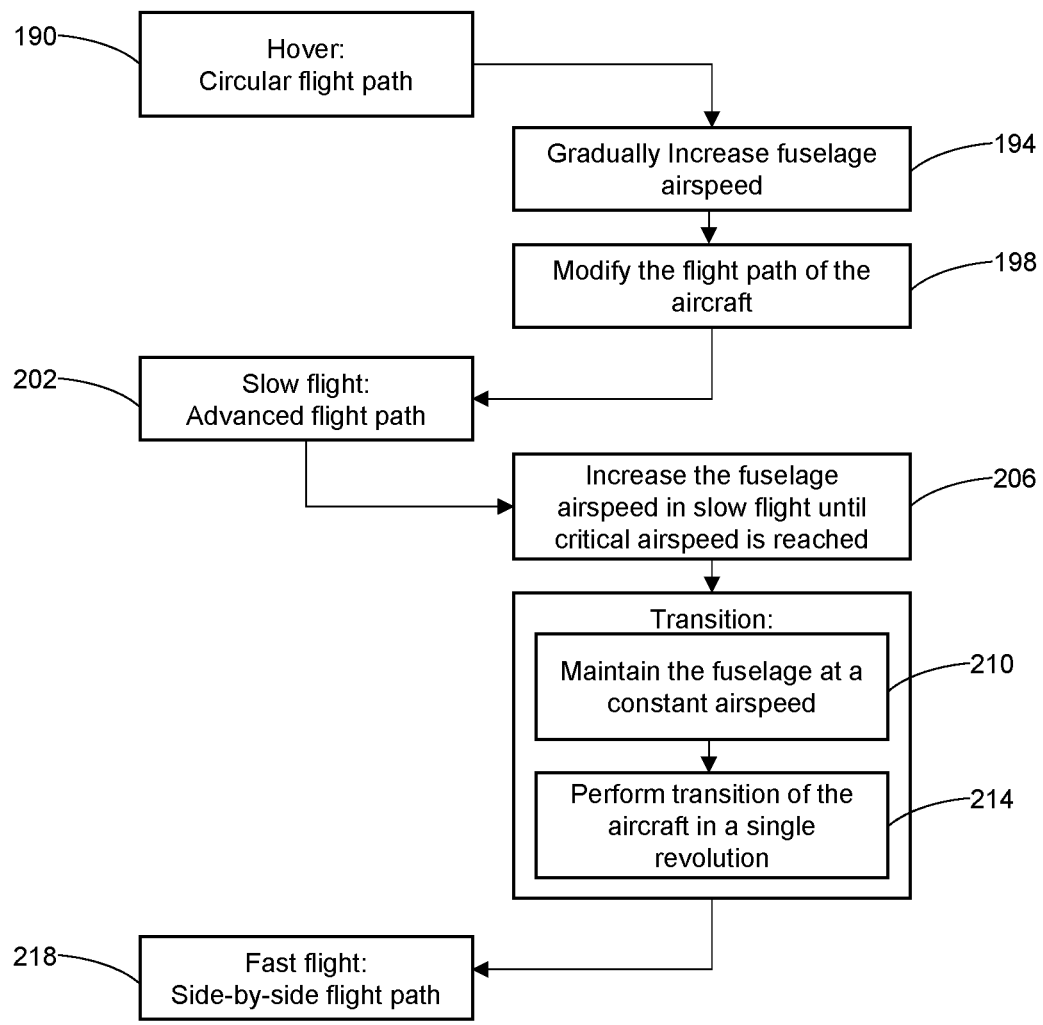
FIG. 7 illustrates, in accordance with at least one embodiment of the invention, an exemplary flow chart of flight transitions of the tethered aircraft system.

FIG. 7 shows an exemplary method of transitioning to fast flight that is using a non-circular flight path 144 for accelerating the payload gradually. The method begins with hovering in circular flight path 190 to increase fuselage 50 airspeed 194 and modify flight path of the wing structure 22, 198. Then, the wing structure 22 moves in slow flight with advanced flight path 202 moving to increase fuselage 50 airspeed in slow flight until critical airspeed is reached 206. Transition flight is following and begins with maintaining fuselage 50 at constant airspeed 210 and performing transition of wing structure flight in a single revolution to a linear airspeed flight 214 that is resulting in a side-by-side fast flight path 218.

Figure 8:
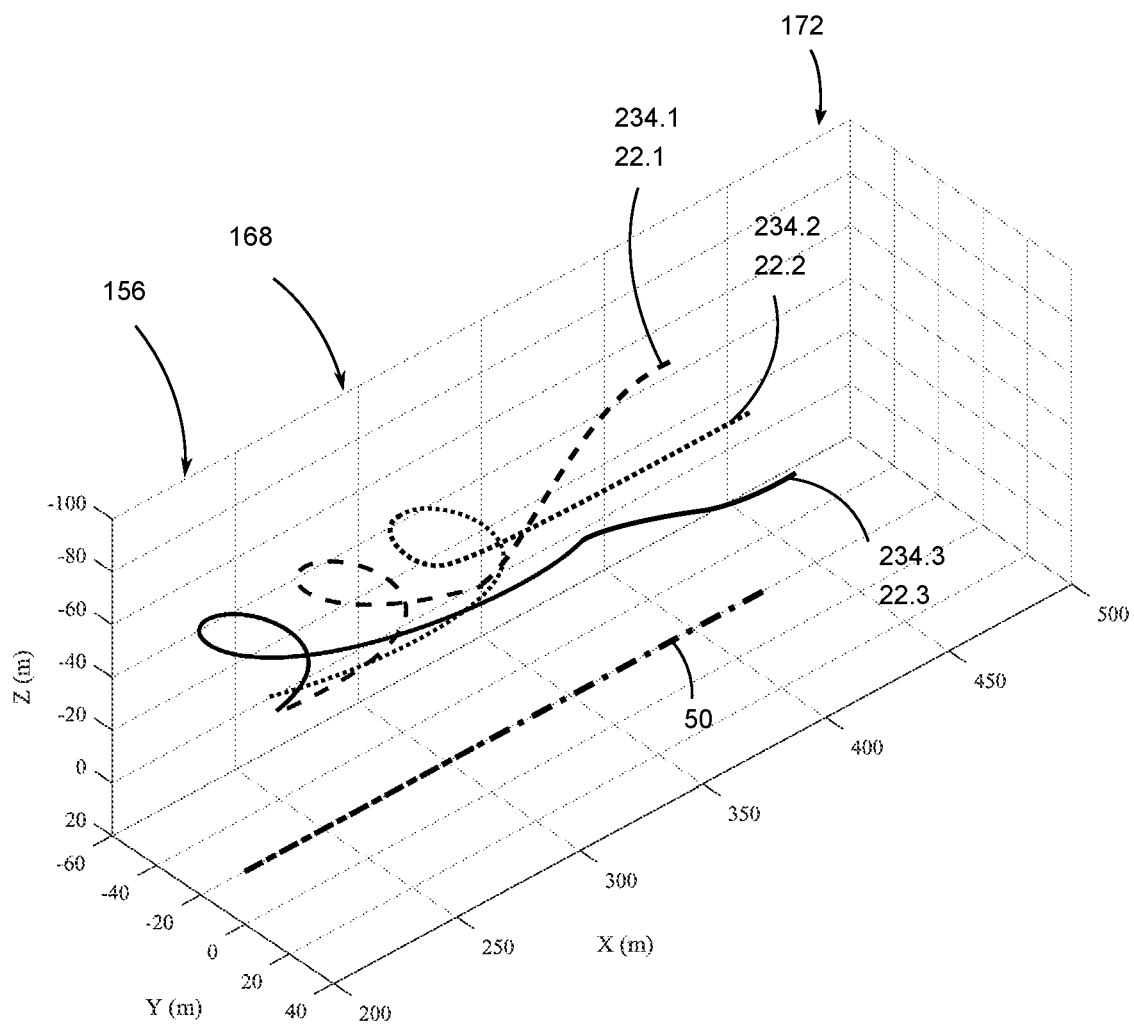
FIG. 8 illustrates, in accordance with at least one embodiment of the invention, an exemplary graph of flight transitions of the tethered aircraft system from the fourth to the fifth configuration.

The transition between the forward flight mode (slow flight) 156 characterized by periodic flight path 234 (appearing or occurring at intervals) of the wing structures 22 to the high-speed flight 172 characterized by a steady position of the aircraft is performed is a time period in the order of seconds. The transition 168 occurs when the fuselage 50 has already reached a minimal critical transition speed. Then, the flight path 234 of the wing structures 22 is rapidly modified as shown in FIG. 8. The fuselage 50 maintains the same airspeed during the transition 168, with the aid of other sources of external forces, such as the thrusters 46 and control surface deflection on the fuselage 50.

Figure 9A:
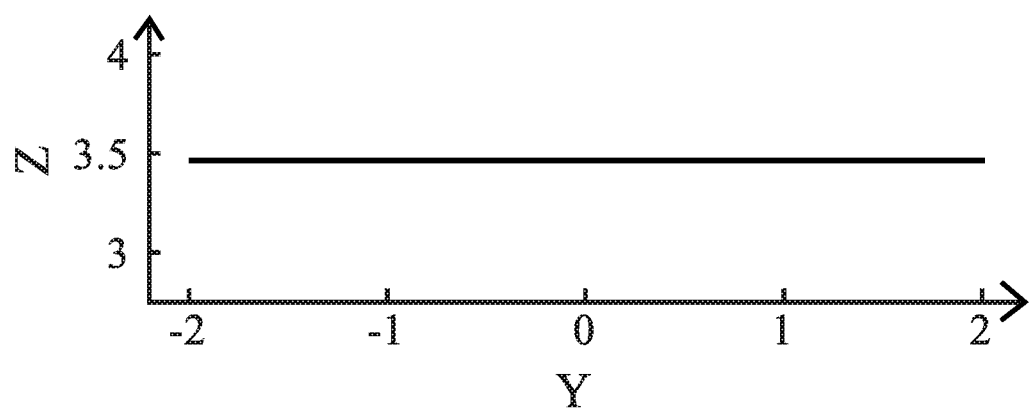
FIG. 9A illustrates, in accordance with at least one embodiment of the invention, an exemplary positioning graph of the tethered aircraft system.
Figure 9B:
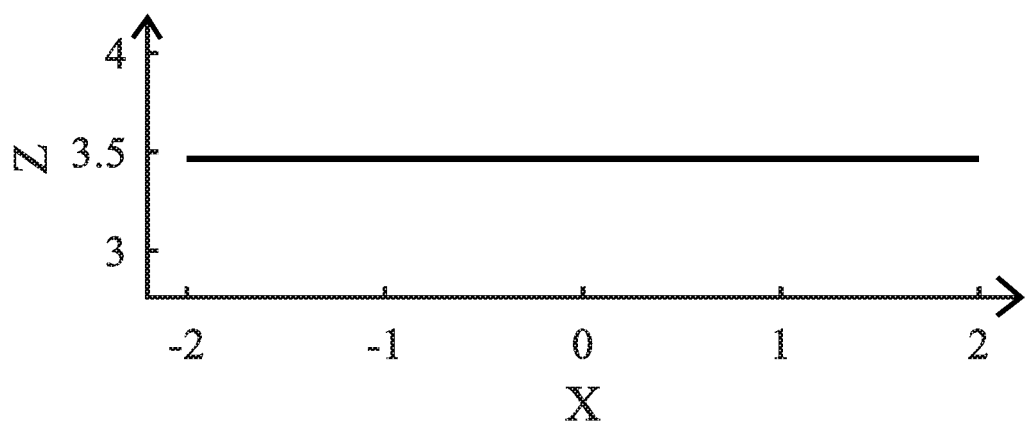
FIG. 9B illustrates, in accordance with at least one embodiment of the invention, an exemplary positioning graph of the tethered aircraft system.

FIGS. 9A and 9B are illustrating a side view of a circular flight path performed by tethered wing structures 22. Since the flight path 234 is circular, and the distance between the wing structures 22 and the fuselage 50 remains constant (assuming a constant tether length), the altitude of the wing structure 22 remains constant. As a consequence, the side view of the wing structure flight path resembles to a simple line.

Figure 10:
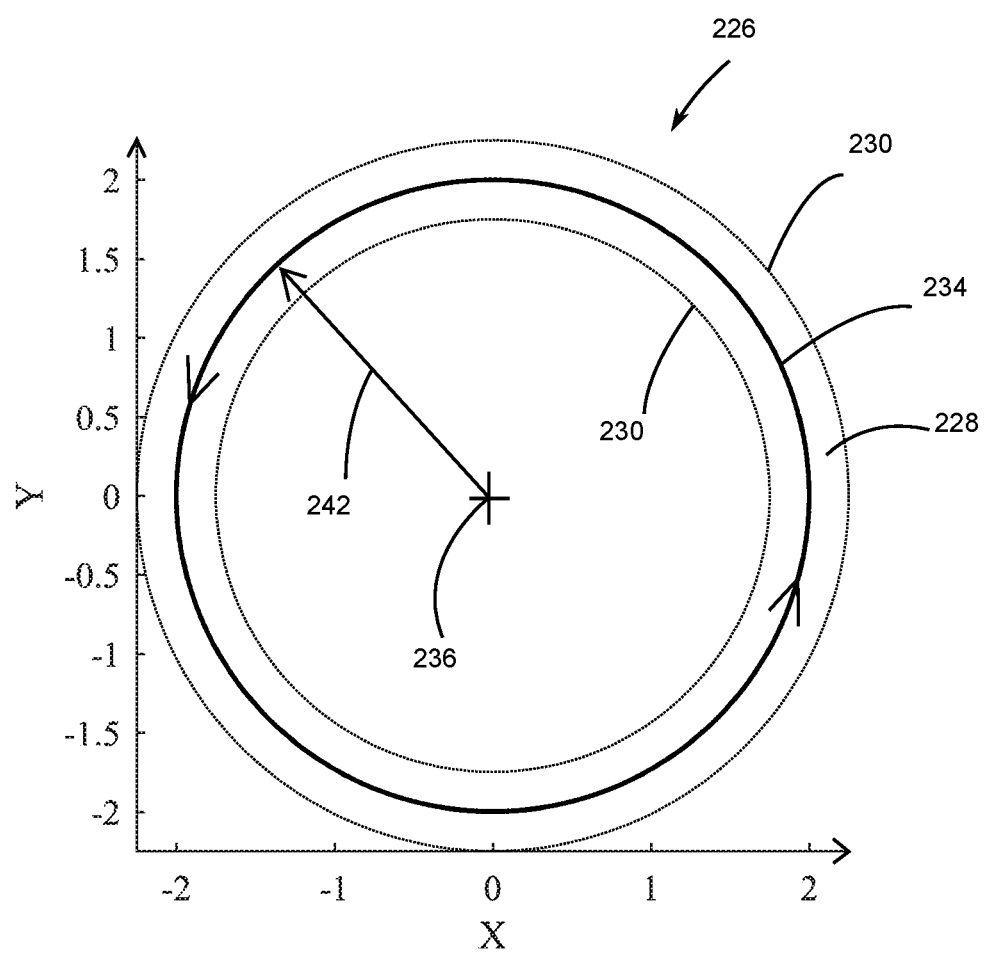
FIG. 10 illustrates, in accordance with at least one embodiment of the invention, an exemplary positioning graph of a flight path of the tethered aircraft system.

Minimizing the induced power in hover, or near hover, can be done by increasing the equivalent disk area with non-circular flight path. Although tethered aircraft aerodynamics differ for helicopter rotors, approximately 30% of their power requirement is related to the induced power. In hover, non-circular flight paths have the potential to increase the disk area and therefore, reduce the power requirement. If a circular flight path was to be performed, the equivalent disk area would be as shown in FIG. 10 illustrating the top-view of the flight path. The two side views of the same flight path are illustrated in FIG. 9A and FIG. 9B. In the case of a circular flight path 226, the equivalent disk area can be approximated by the flight path length multiplied by the wing structure 22 wingspan, and is therefore generally limited by the wing structure 22 wingspan or the flight path radius 242. The disk area 228 in FIG. 10 is shown bounded by a pair of dashed lines 230, which represent the left and right wingtip locations of the wing structure's 22 wings 38. The flight path 234 is illustrated in a solid black line; the center 236 of the circular flight path 226 is also identified. In this example, the tether 18 length is four (4) units, the flight path radius is one point five (1.5) units.

Non-circular flight paths can have shapes similar to an ellipse, where the ratio of the major axis to the minor axis is smaller than two, but greater than unity (unity=circle); the ratio can illustratively be about 10%-15%. The typical tilt angles of the wing structure 22 flight path vertical axis 236 with respect to the horizon does not exceed 20 degrees forward, and 20 degrees lateral for typical wing structure characteristics. Non-circular flight paths are obtained with periodic variations of the control surface and thrust (power) from the propulsion system.

Complex non-circular flight paths with variation in the flight speed are used to reduce the power requirement of the system, both in hover and in forward flight. However, the variations in wing structure speed and the non-circular and periodic flight paths creates high load factors in the three directions. Numerical simulations have shown that the magnitude of the acceleration can reach 100 m/s2 depending on the size of the system. Variations in the system speed also create an acceleration that can reach 10 m/s2. Such periodic variations over long duration can be detrimental of a human, and therefore, an unmanned wing structure is recommended.

Error in the aircraft position in complex periodic flight path by the three or more wing structure are detrimental to the performance of the system. An error in position changes the aerodynamic forces that must be generated by each aircraft to minimize the fuselage motion. The non-optimal aerodynamic forces then increase the losses. In order to minimize the positioning error, unmanned aircraft are used. A central control system coordinates the wing structure target position as a function of time, and at least one control system is used in each wing structure to convert the position command to control surface deflection and power command for each electric motor.

Figure 11:
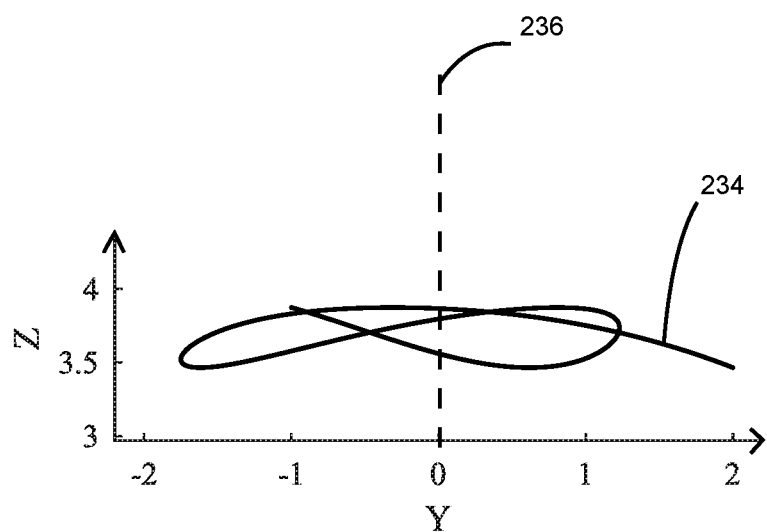
FIG. 11 illustrates, in accordance with at least one embodiment of the invention, an exemplary positioning graph of a non-circular flight path of the tethered aircraft system.
Figure 12:
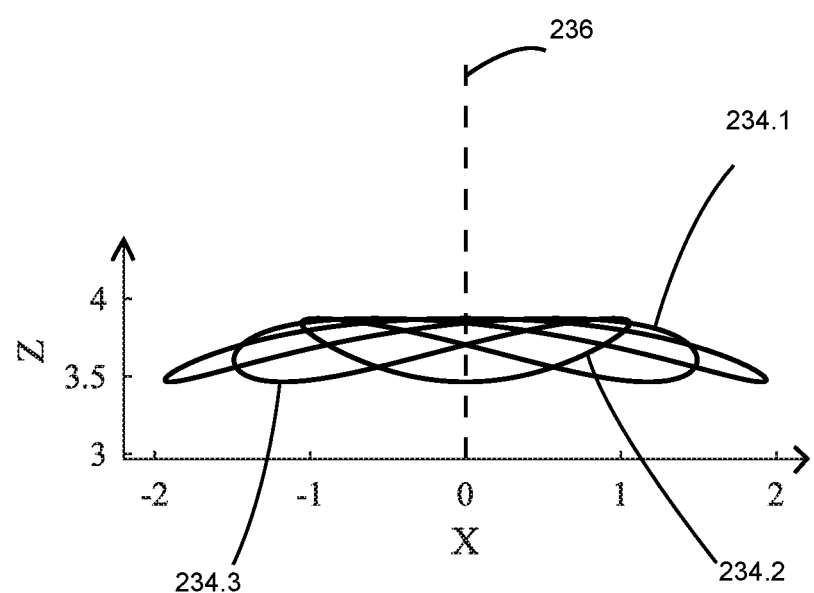
FIG. 12 illustrates, in accordance with at least one embodiment of the invention, an exemplary positioning graph of a non-circular flight path of the tethered aircraft system.
Figure 13:
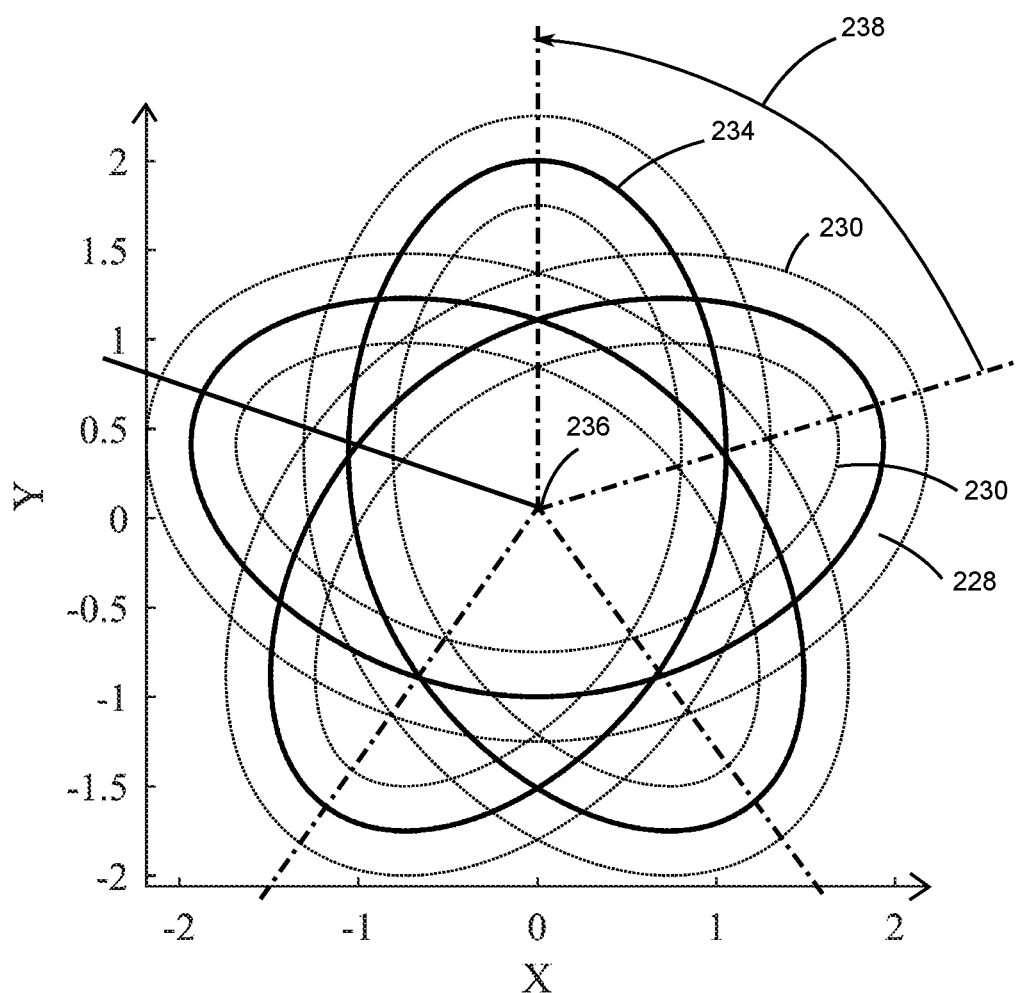
FIG. 13 illustrates, in accordance with at least one embodiment of the invention, an exemplary positioning graph of a non-circular flight path of the tethered aircraft system.

Examples of non-circular flight paths in a hover flight mode are:

Elliptical with phase offset at every period (rotor revolution): In this concept, the tethered aircraft perform a flight path on (or near) a surface defined by a sphere from the reference fuselage position. At every rotor revolution, the elliptical flight path is rotated by a fraction of 360 degrees such that the resulting flight path is a hypotrochoid, as shown in FIG. 11, FIG. 12 and FIG. 13. Two side views of the wing structure flight path 234 are illustrated in FIG. 11 and FIG. 12. The flight path 234, in hover in the present illustrated example, and associated disk area 230 over three (3) revolutions for an elliptical flight path 234 with an angular offset every revolution (hypotrohoid) is illustrated in FIG. 13. The disk area 228 is shown between the dashed lines 230. The disk area 228 in FIG. 13 is bounded by the dashed lines 230, which represent the left and right wingtip locations of the wings 38 over the three periods of the flight path 234 and the wing structure 22 center flight path 234 is illustrated with a solid black line generally in the center of the disk area. The tether 18 length is four (4) units, semi-major axis is two (2) units, semi-minor axis is one (1) unit and an offset of 33% every revolution. One can appreciate that the illustrated three periods are for illustrative purpose and a different number of periods can be used without departing from the scope of the present invention.

Figure 14:
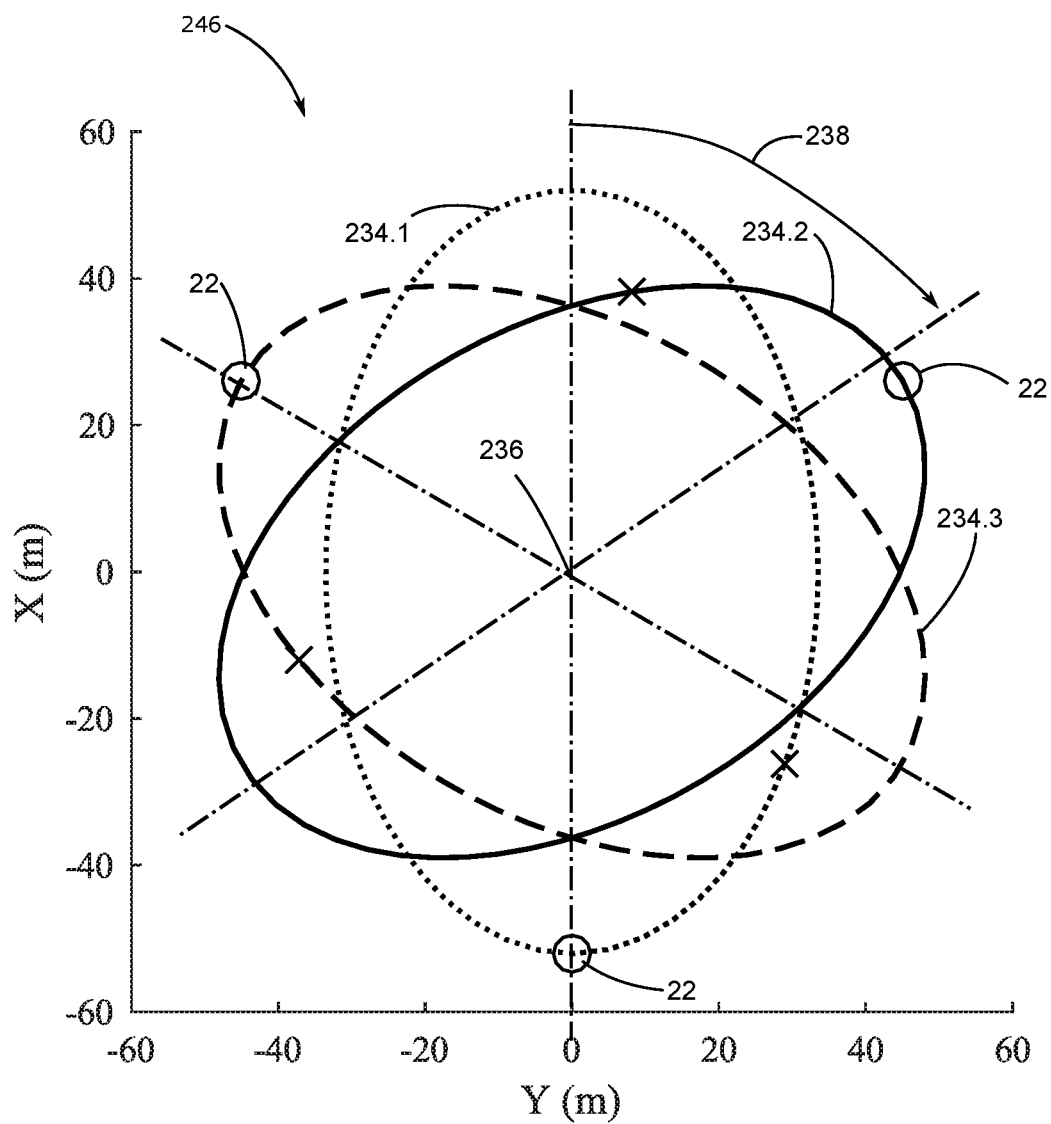
FIG. 14 illustrates, in accordance with at least one embodiment of the invention, an exemplary positioning graph of a non-circular flight path of the tethered aircraft system.
Figure 15:
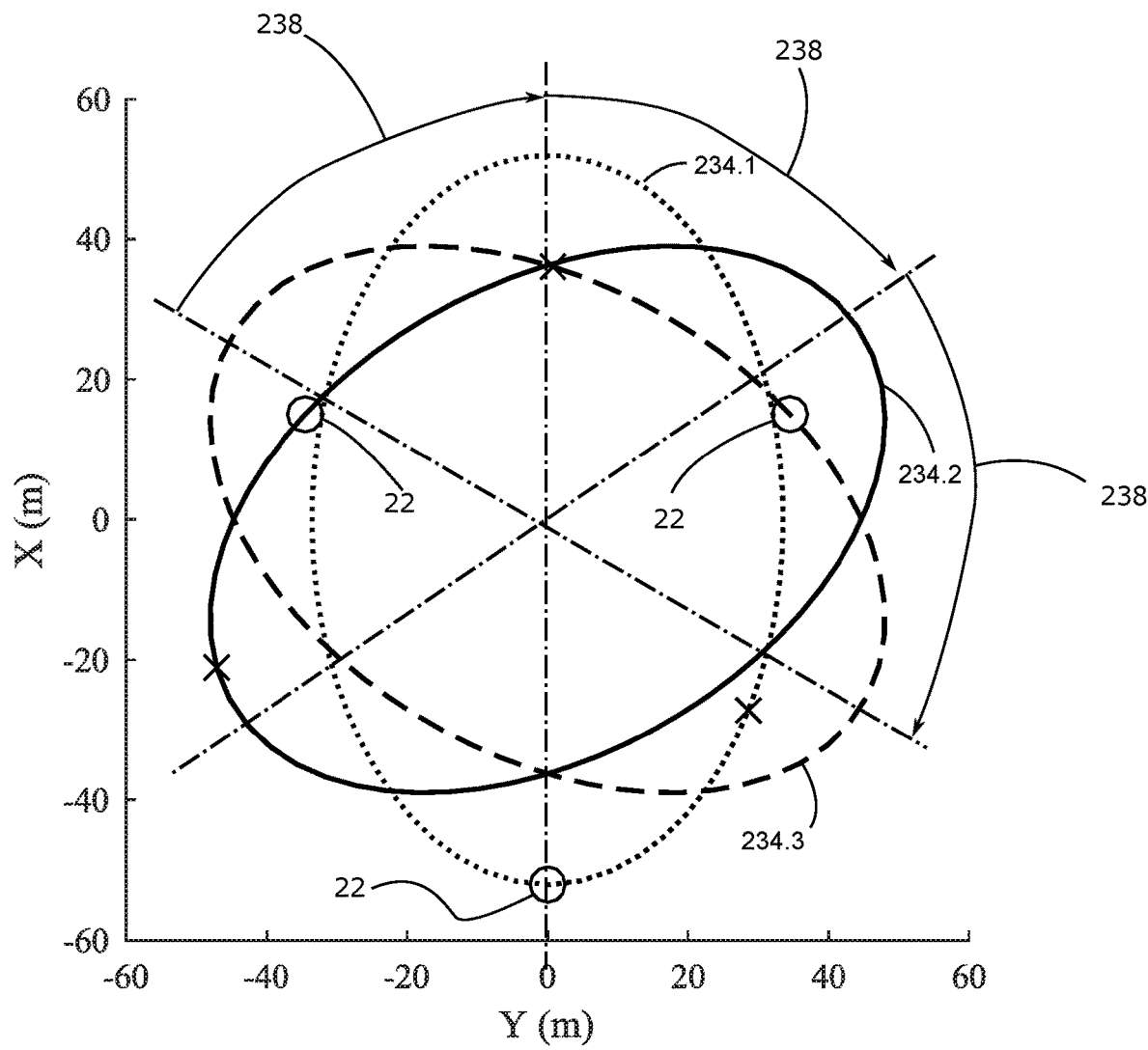
FIG. 15 illustrates, in accordance with at least one embodiment of the invention, an exemplary positioning graph of a non-circular flight path of the tethered aircraft system.

Elliptical flight path 234 with an angular phase offset 238 between the flight paths of the three aircraft: In this case, each of the tethered aircraft performs a different non-circular flight path as seen from a top view. As an example, three tethered aircraft can perform an elliptical flight path with an offset 238 of 120 degrees. Two configurations are presented; a no lag trajectory 246 is illustrated in FIG. 14 while a lag trajectory is illustrated in FIG. 15. Each wing structure 22 have their individual flight path 234.1, 234.2, 234.3 seen from the top view. The circle markers "O" highlight the initial position at time=0 second, and the "X" markers highlight the position at time=1.5 seconds. FIG. 14 depicts a case where three (3) wing structure 22 reach the apex of the elliptical flight path at the same time, while FIG. 15 depicts a similar flight path where the three (3) wing structure 22 reach the apex at the same time.

Other: Any flight path 234 that increases the disk area when the flight path is projected on a horizontal surface tangent to the surface of the Earth. Note that all those configurations of non-circular flight 234 in hover have shown reductions in power requirement in hover through modeling and simulations.

Figure 16:
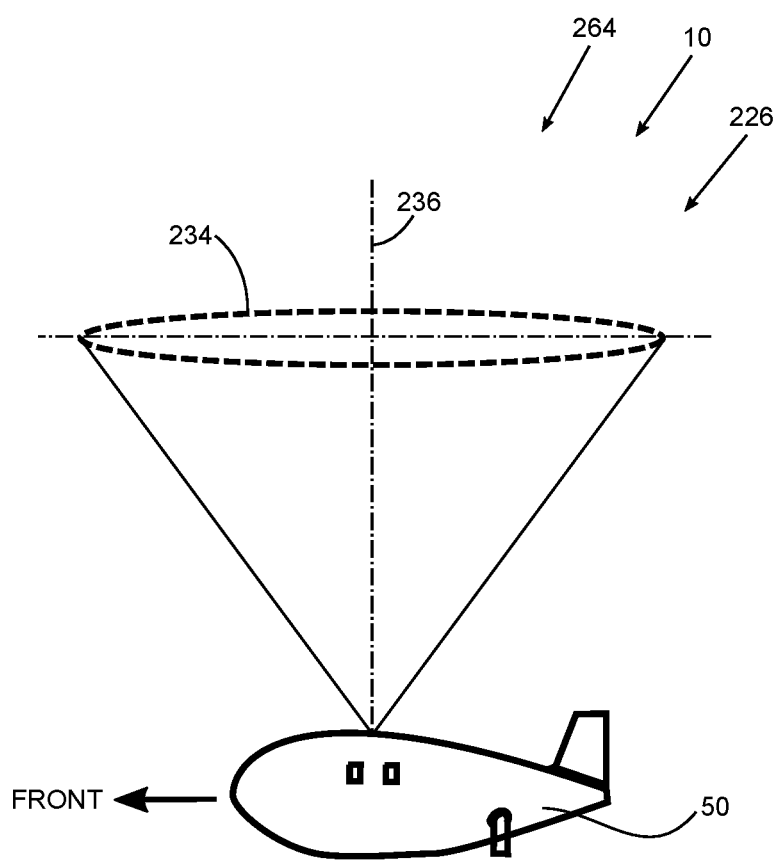
FIG. 16 illustrates, in accordance with at least one embodiment of the invention, a schematic side elevation view of the tethered aircraft system without forward tilt.
Figure 17:
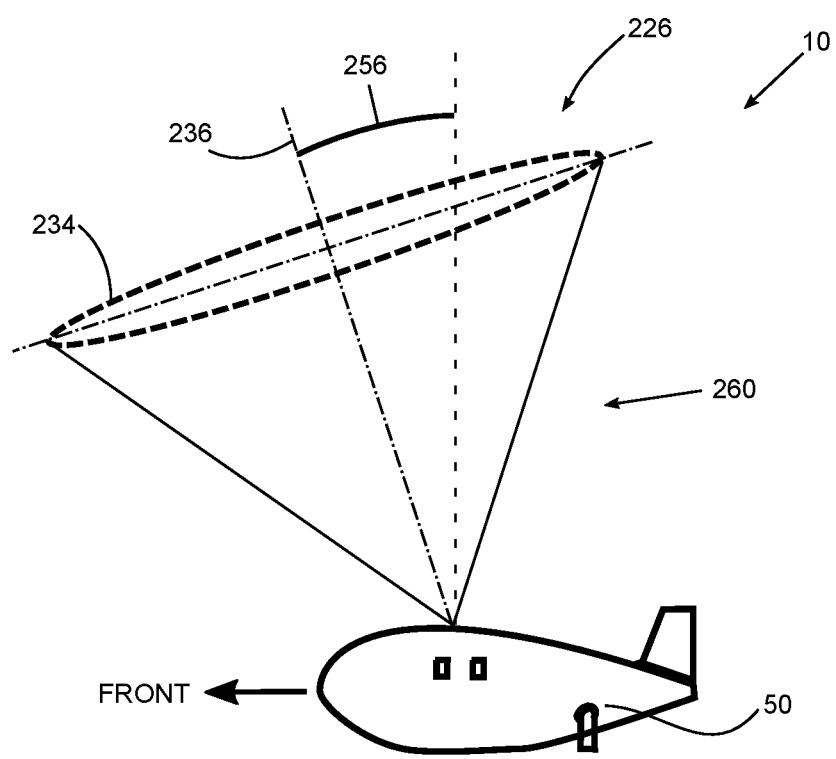
FIG. 17 illustrates, in accordance with at least one embodiment of the invention, a schematic side elevation view of the tethered aircraft system with forward tilt.
Figure 18:
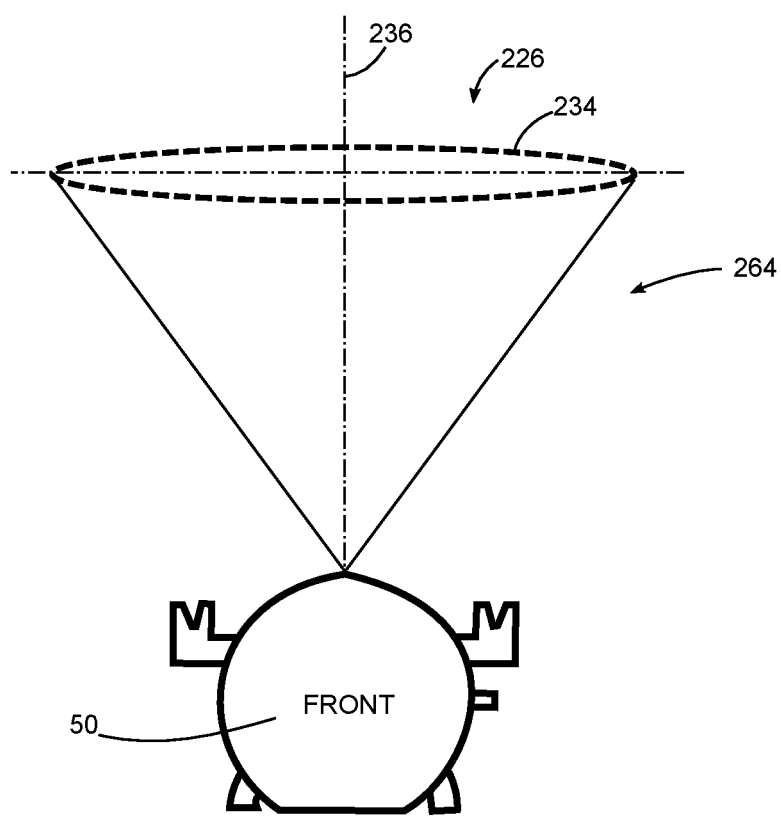
FIG. 18 illustrates, in accordance with at least one embodiment of the invention, a schematic front elevation view of the tethered aircraft system without side tilt.
Figure 19:
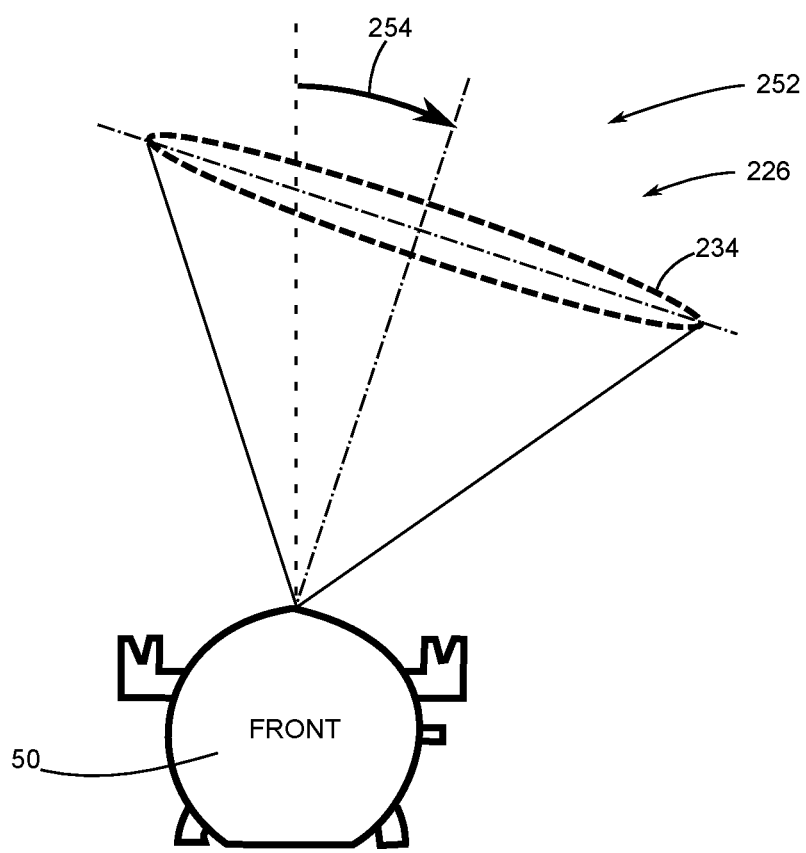
FIG. 19 illustrates, in accordance with at least one embodiment of the invention, a schematic front elevation view of the tethered aircraft system with side tilt.
Figure 20:
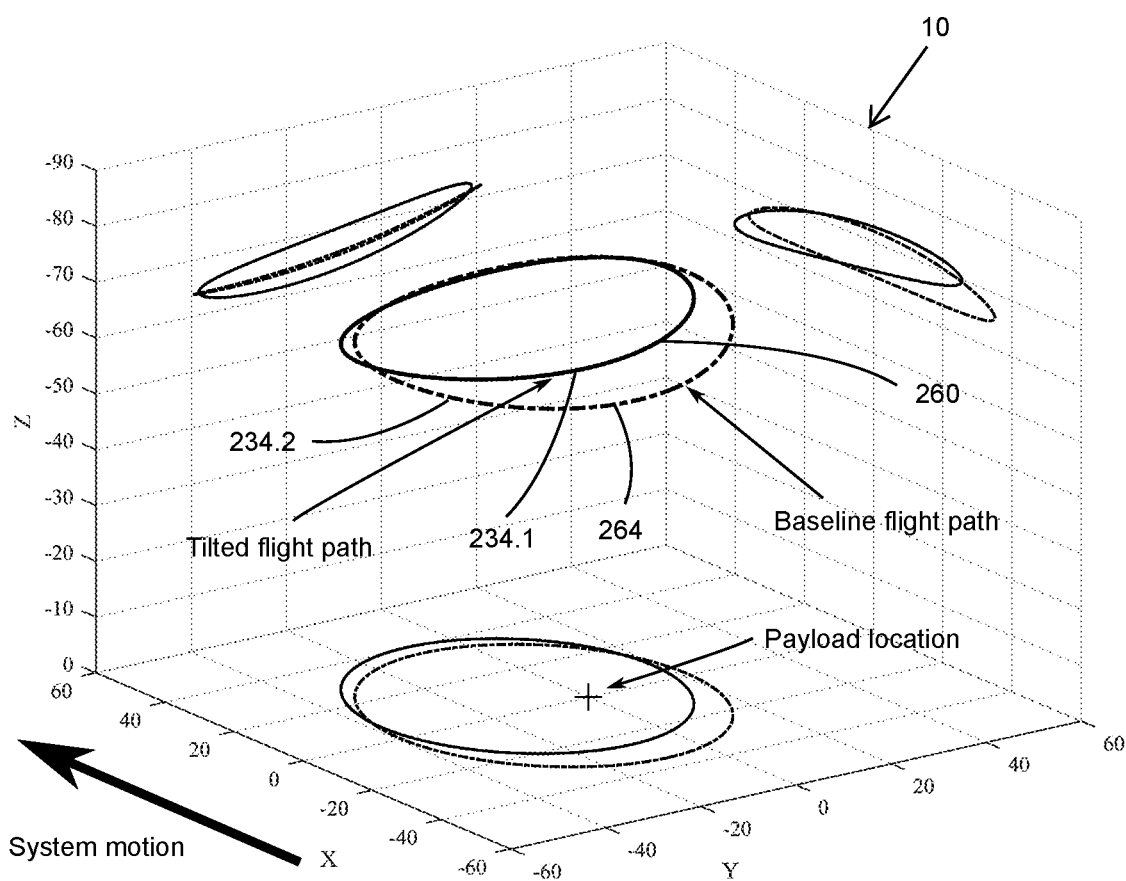
FIG. 20 illustrates, in accordance with at least one embodiment of the invention, a schematic graph of a flight path of the tethered aircraft system.
Figure 21:
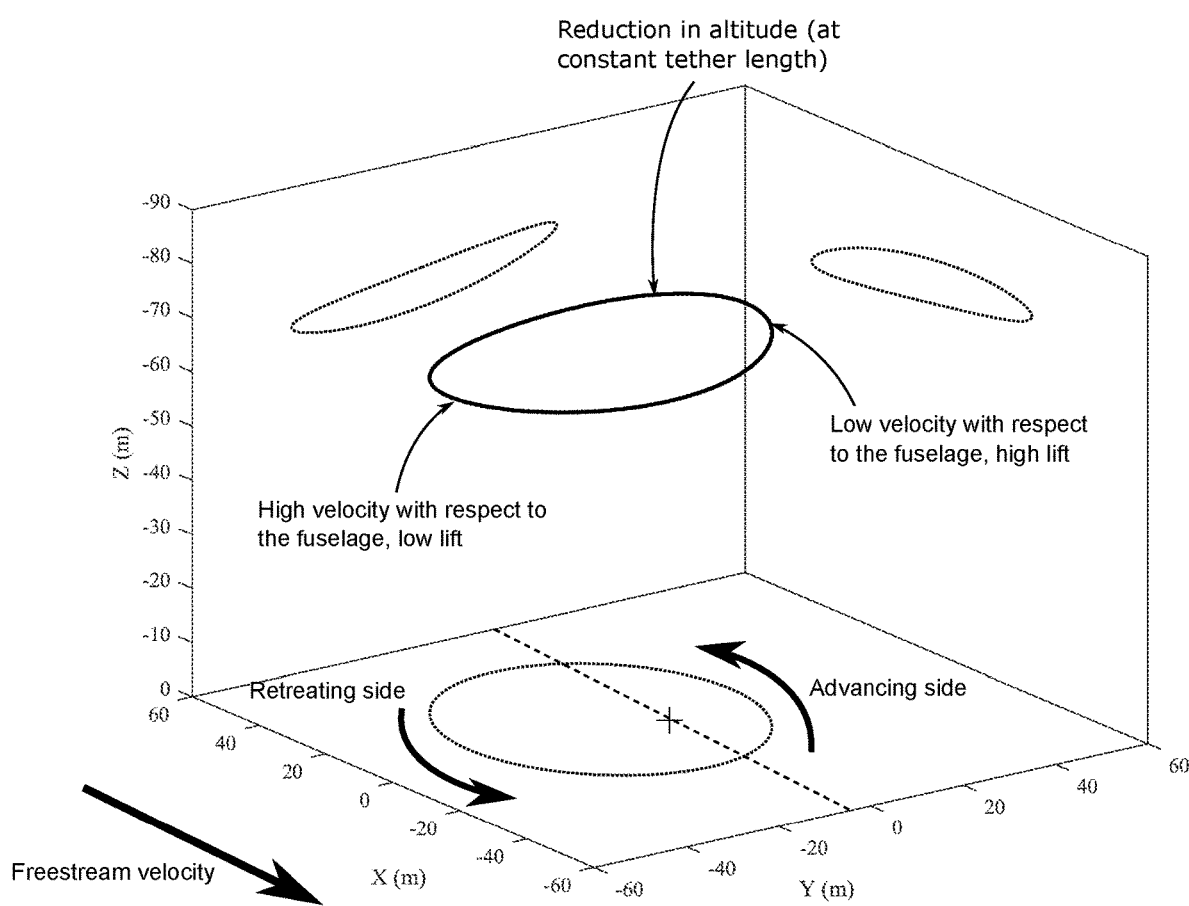
FIG. 21 illustrates, in accordance with at least one embodiment of the invention, a schematic graph of a flight path of the tethered aircraft system.
Figure 24:
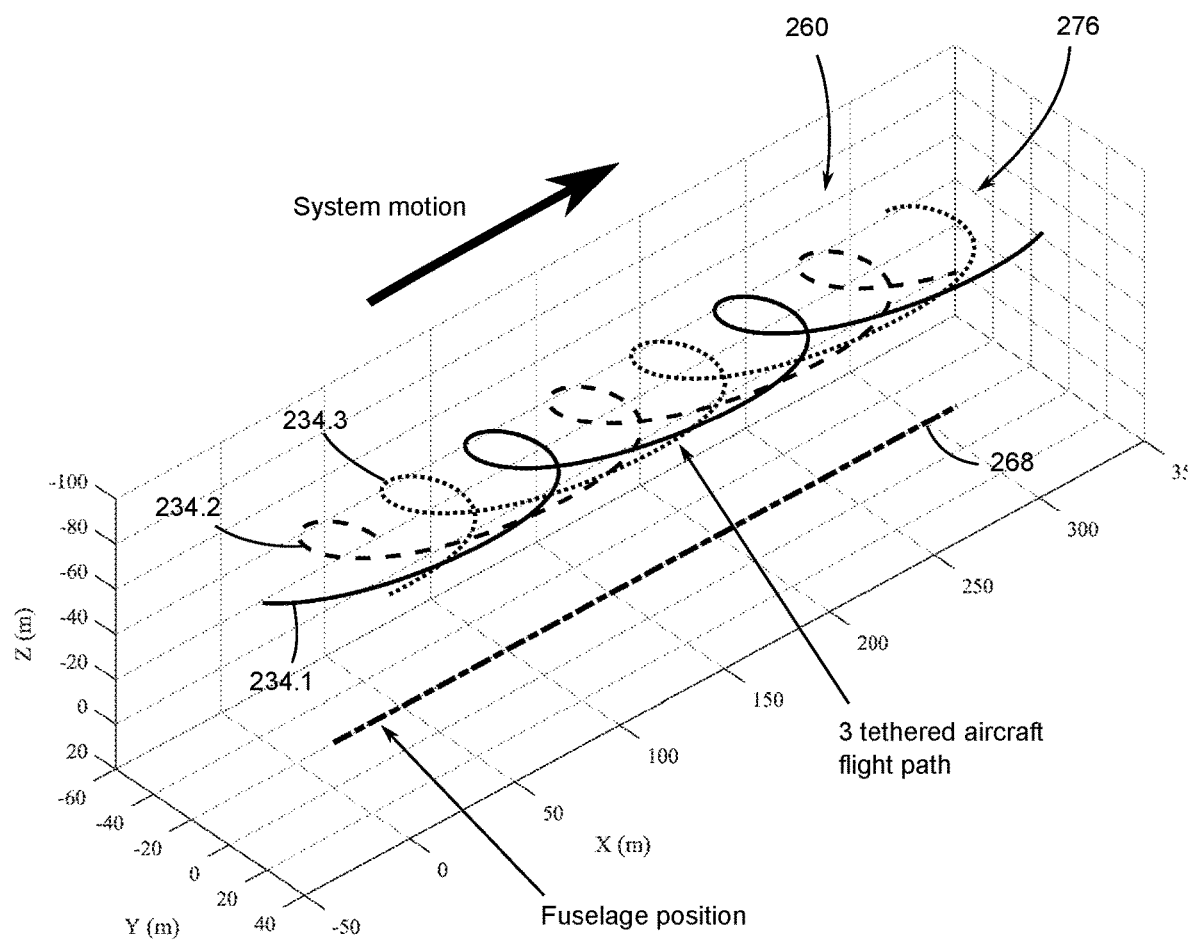
FIG. 24 illustrates, in accordance with at least one embodiment of the invention, a schematic graph of a flight path of the tethered aircraft system in a fixed reference frame with forward tilt.
Figure 25:
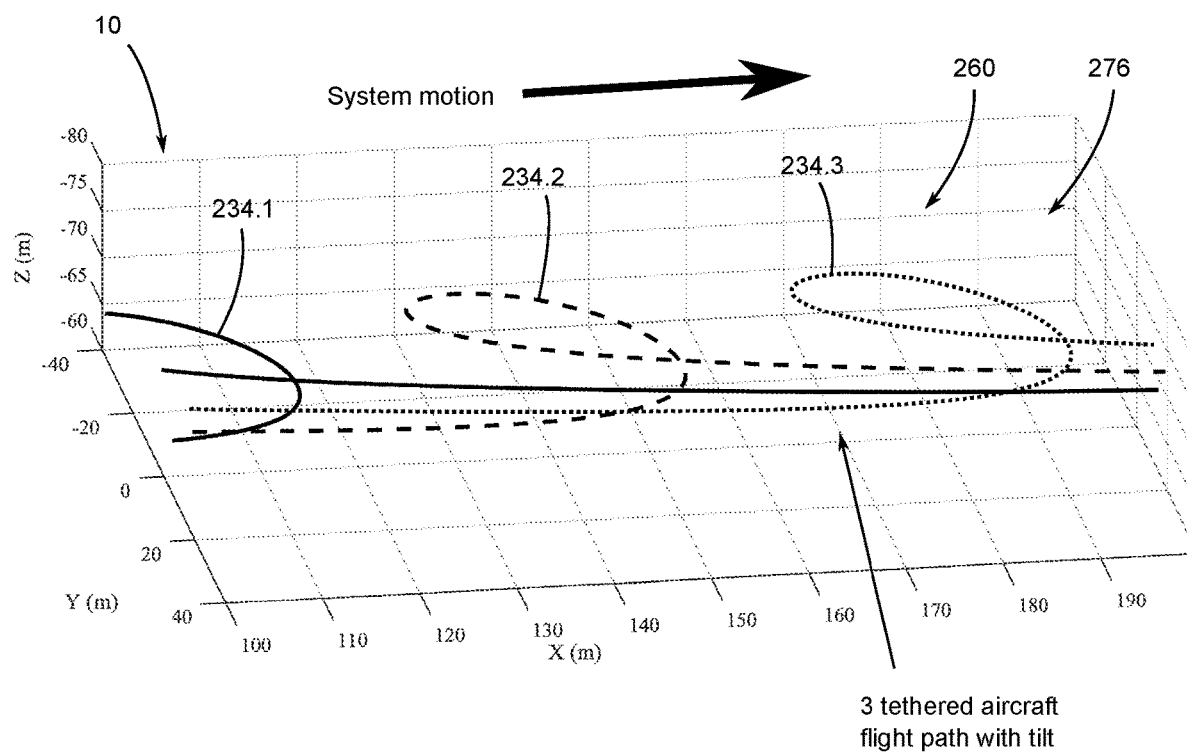
FIG. 25 illustrates, in accordance with at least one embodiment of the invention, a schematic graph of a flight path of the tethered aircraft system in a fixed reference frame with forward tilt.
Figure 26:
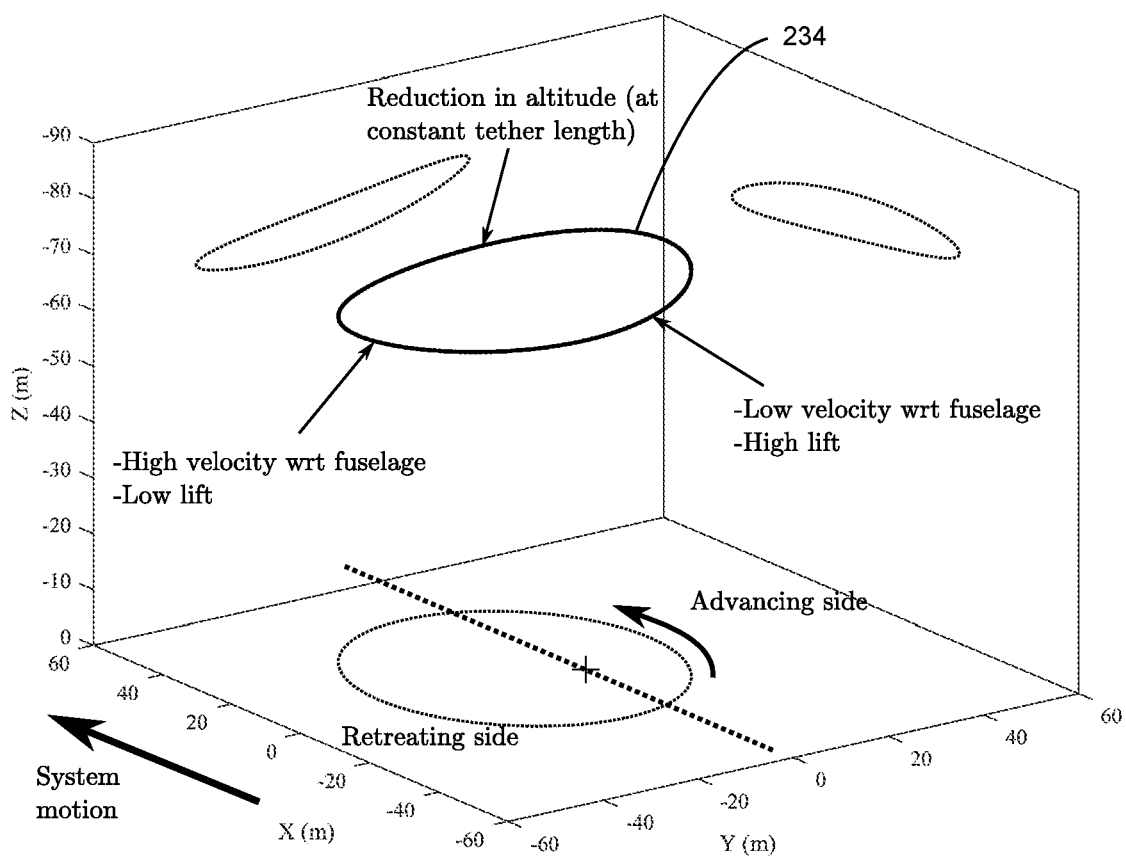
FIG. 26 illustrates, in accordance with at least one embodiment of the invention, a schematic graph of a flight path of the tethered aircraft system without forward tilt in a reference frame moving with the payload.

In slow flight mode, the power required can be reduced by optimizing the aircraft flight path 234. The optimal flight path is a combination of 4 different flight path characteristics: forward tilt 260 of the flight path 234 illustrated in FIG. 17 in contrast with a no-tilt flight path 264 illustrated in FIG. 16, sideways tilt 252 of the flight path 234 illustrated in FIG. 19 with a sideway tilt angle 254. In contrast a no-sideway tilt flight path 264 is illustrated in FIG. 18, variation from the circular flight path 234 and variations of the wing structure 22 airspeed as a function of their position. An example of an optimal non-circular flight path 276 in slow flight, when the observer is fixed in space, is shown in FIG. 24 and FIG. 25. The same example is shown in FIG. 21 with the observer fixed on the fuselage 50 reference frame.

Tilting the wing structure 22 flight path 234 sideways 252 leads to a reduction in power required in slow flight. The flight path 234 is tilted towards the retreating side, such that the wing structure passes closer from vertical, on the advancing side. This allows a lift transfer from the wing structure 22 on the retreating side to the wing structure 22 on the advancing side. The optimal tilt is a function of the fuselage 50 airspeed. The tilt of the flight path 234 is controlled by the aircraft control deflection and attitude as a function of their position above the fuselage 50. Their respective position along the flight path 234 is achieved by scheduling the trust of their propellers.

In conventional helicopters, the airspeed on over each rotor blade is a function of the velocity caused by the angular motion of the blades and the velocity of the aircraft itself. The rotor blade that is moving in the same direction of the helicopter is called an advancing side and the rotor blade that is moving is called a retreating blade. The airspeed is lower on the retreating side and greater on the advancing side, and this is airspeed discrepancy is greater increases as the aircraft airspeed increases. The lift generated by each blade is proportional to the squared of the airspeed. In order to balance the moment generated on each side of the helicopter, the blades on the retreating side have to be pitched a lot more than the pitch on the retreating side (more angle of attack on the retreating side). This limits the maximum velocity of the helicopter because of limitations in angle of attack and lift on the retreating side. Also, the advancing blade sees very high airspeed at the tip that can approach the speed of sound and generate a lot of drag.

The use of tethered wing structures 22 allows for a different approach to mitigate the negative impact inherent to a rotating blade. The simplified explication passes by a sideways tilt of the wing structures 22 flight path 234 in slow flight 156: the advancing wing structure 22 passes closer to fuselage 50 (close to be vertically above it) and the retreating wing structures 22 flies farther out. To balance the forces on the fuselage, the lift generates by the advancing wing structure 22 is greater than the lift generated by the retreating wing structure 22. Moreover, the variations of wing structures 22 airspeed as a function of their respective positions on the flight path 234 allows to adjust the airspeed as a function of position and provide the required lift.

A remote control module 312, seen in FIG. 2, allows to provide the system with the required control inputs. The control input can take many forms. First, it can be the control input of each UAV control surfaces and propellers and/or the control surfaces of the fuselage and the thrusters. Control input can also be the overall motion parameters of the fuselage such as but not limited to altitude, climb speed, forward flight speed or point-to-point target locations. In this case, the fuselage control unit and the aircraft control units will optimize the flight parameters as a function of time to minimize the power requirement to achieve the prescribed flight condition. This is realized by a scheduling of the aircraft propeller thrust, aircraft control deflection, fuselage control deflection and thruster actuation. The remote control can also provide geometric constraints to the aircraft flight path such as the maximum flight radius. The control unit can also provide pre-established flight paths to choose from. The remote control unit can be in the form of a user interface 316, or be a module that interfaces with a computer.

Figure 22:
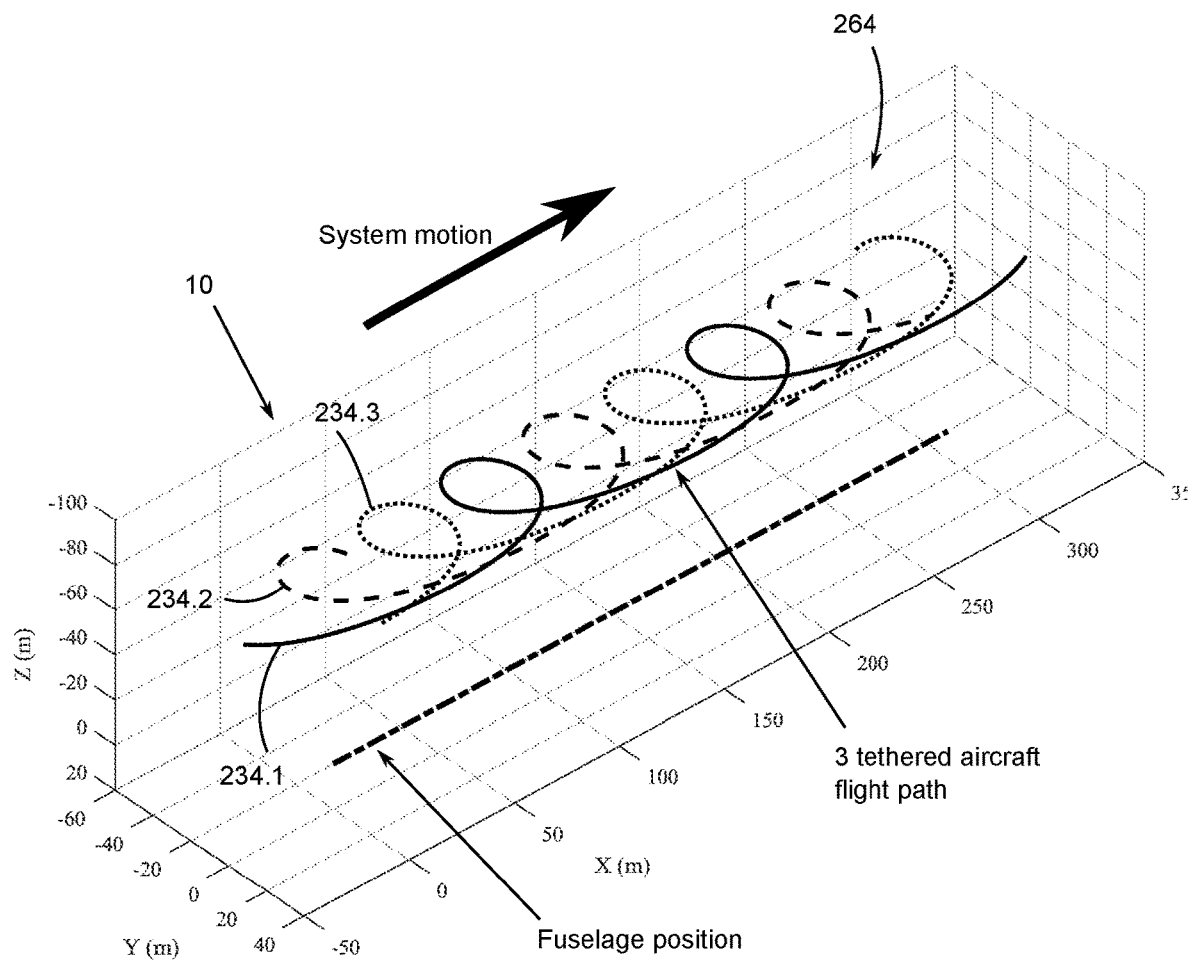
FIG. 22 illustrates, in accordance with at least one embodiment of the invention, a schematic graph of a flight path of the tethered aircraft system in a fixed reference frame without forward tilt.
Figure 23:
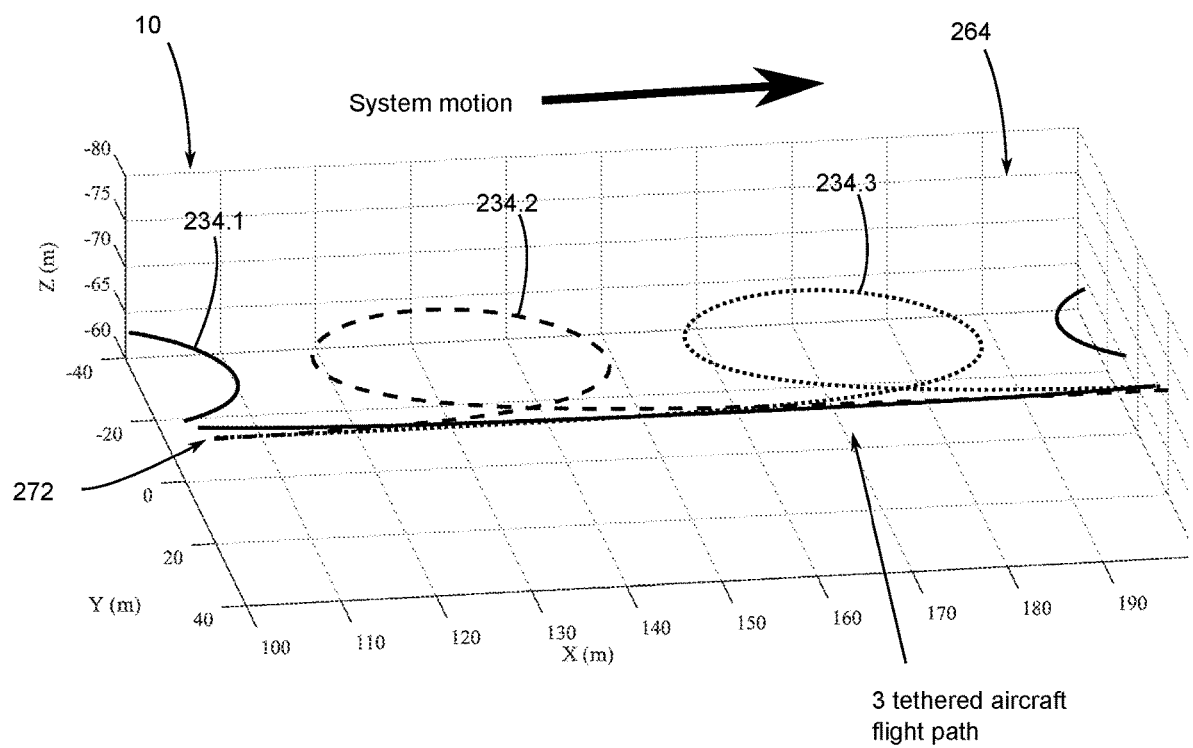
FIG. 23 illustrates, in accordance with at least one embodiment of the invention, a schematic graph of a flight path of the tethered aircraft system in a fixed reference frame without forward tilt.

Tilting the wing structure 22 flight path 234 forward 260 can, in accordance with at least one embodiment of the invention, reduce wake interaction between tethered aircrafts. The wake interaction is the increase in power requirement of a wing structure 22 when it flies close to the wake generated from another wing structure 22, or its own wake. FIG. 21 illustrates the concept of a forward tilt 260 and the other parameters of the wing structure 22 flight path 234 as if an observer moves with the tethered aircraft system 10. The fuselage 50 position 268 is also illustrated in the figures. FIG. 24 and FIG. 25 exact same flight path for three (3) wing structures 22, when the observer is fixed in space. In contrast, FIG. 23 and FIG. 24 illustrates a flight path for three (3) wing structures 22 without the presence of forward tilt 260. FIG. 22 illustrates a no tilt flight path 264. The flight path 234 of one wing structure 22 encounters 272 the flight paths 234 of other wing structures 22 of the tethered aircraft system 10 on the lower portion of FIG. 23. One can appreciate from FIG. 25 a flight path 234 with a strong forward tilt flight path 260 increases the distance between the wake of the wing structures 22.

Two main advantages result from the presence of a tilt of the wing structure 22 flight path 234 and the resulting reduction in the wake interaction: (1) Reduction in the power requirement for the whole system, (2) Reduction in the air turbulence from the non-uniform air velocity when a wing structure encounters or flies closely to the wake of any wing structure. The presence of air turbulence and rapid changes in the velocity (both magnitude and direction) increases the complexity of the control system of the wing structure. A discrepancy in the wing structure position from the air turbulence can result in an undesirable fuselage motion.

A forward tilt 256 or a side tilt 252 of the wing structure 22 flight path 234 is obtained through a proper control surface deflection and thrust scheduling based on the target wing structure 22 position and tether 18 tension. A general tendency is that a forward tilt 256 in the order of 10 degrees significantly reduces the wake interaction based on coupled aerodynamic and dynamic numerical simulations of the system.

A forward tilt 256 or a side tilt 252 can be achieved without affecting the fuselage 50 motion with three or more wing structure 22. With such configuration, there exist multiple wing structure 22 positions which would lead to the same fuselage 50 motion through a combination of tether forces on the fuselage 50.

Variations from the baseline circular flight path, generally defined about a virtual vertical axis 236 extending through the fuselage 50, are used to reduce the power requirement. Slight variations such as an elliptical flight path can reduce the power requirement when combined with the other flight path parameters. A strong coupling exists between the four (4) flight path parameters, to reach the optimized configuration of the wing structure 22 flight path 234. As for the forward tilt 256 and side tilt 252 of the wing structure flight path 234, a proper scheduling of control surface deflection and thrust variation are used to achieve variations from a circular flight path 234. Variation in the wing structure 22 airspeed is used to minimize the wing structure drag and the tether drag. On the advancing side, the wing structure 22 airspeed (with respect to the ambient air) is higher than on the retreating side. With respect to the fuselage 50, the wing structure 22 speed is lower on the advancing side than on the retreating side. Such variation allows an operation of the wing structure closer to their most optimal flight condition, such that the power requirement is reduced. The optimized speed scheduling of each wing structure 22 is obtained through proper periodic thrust variations. In case of strong flight speed reduction, it may be possible to harvest the power from one wing structure 22 and send it to another wing structure 22.

The flight path parameters (forward tilt 256 of the flight path 234, sideways tilt 252 of the flight path 234, variation from the circular flight path 234 and variations of the wing structure 22 airspeed as a function of its position) have to be optimized as a function of the air density, fuselage mass, tether properties, the wing structure properties, system airspeed, and others. Strong coupling exists between the parameters, such that they cannot be optimized independently. This concept of "reconfigurable rotor system" is at the core of this invention, where the wing structure 22 flight path 234 parameters adapts to the flight condition to minimize the power requirement.

Figure 27:
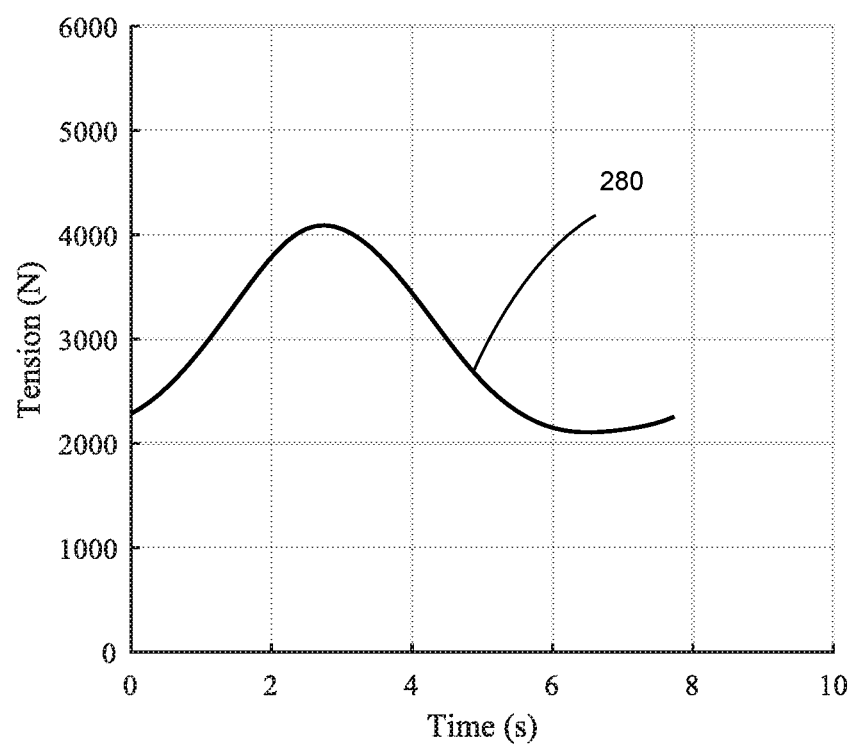
FIG. 27 illustrates, in accordance with at least one embodiment of the invention, a schematic graph of a tension variation in the tether over a period of a non-circular flight path in slow flight.

The non-circularity of the flight path 234, the tilt (2) of the wing structure flight path axis 263, and variations in wing structures 22 velocity create a load transfer between the wing structures 22. FIG. 21 is an example of an optimal flight path 234 which combines the four (4) parameters described before, and FIG. 27 for the consequence of this non-circular flight path axis 236 on the tether 18 tension 280 for one of the wing structure 22. Numerical simulations show a power reduction of up to 40% compared to a baseline circular flight path with no tilt, and constant wing structure speed.

There are many factors that can cause unsteady forces on the fuselage 50 and induce undesired motions such as wind gusts. Also, in some complex wing structure 22 flight paths 234, the optimal flight path 234, from an energetic standpoint, might not necessarily lead to balanced forces on the fuselage 50, which can induce a dynamic motion. Undesired motions include rapid change in orientation or position, and also cyclic change in orientation or position. In order to limit the motion of the fuselage 50 and mitigate the negative impacts of unsteady forces, external aerodynamic forces can be applied on the fuselage 50. This can be realized by installing thrusters 46 in the form of, but not limited to, propellers or ducted fans on the side of the payload. Because they are directly mounted on the fuselage 50 in various locations, as illustrated in FIG. 22, for propelling the fuselage 50 in various directions. The control authority of the thrusters 46 is greater than the tethered wing structure 22 forces and can lead to quicker response and better control. The controller used to limit the fuselage 50 motion can use information coming from all sensors, both on the fuselage 50 and on each wing structure 22. The control strategy will schedule the appropriate aerodynamic force coming from each thruster 46. The aerodynamic forces can be constant in time, cyclic, or be of short duration.

The forces acting on the fuselage 50 are coming from the wing structures 22 trough the tethers 18 and form the thrusters 46. When the fuselage 50 has a forward velocity, forces can also be generated by the control surfaces of the fuselage 50. The combination of forces is used to provide constant lift to keep the fuselage 50 at a constant altitude and to limit the fuselage 50 motion to a minimum. The motion of the wing structures 22 is described by Equation 3 and Equation 4:

$$\Sigma F = ma \qquad \text{Equation 3}$$

$$\Sigma M = \bar{I}\alpha \qquad \text{Equation 4}$$

where F is a force vector, M is vector of moment about the center of mass, m the mass of the fuselage 50, $\bar{I}$ is the inertia tensor, a is the acceleration vector and α is the angular acceleration vector.

Figure 36:
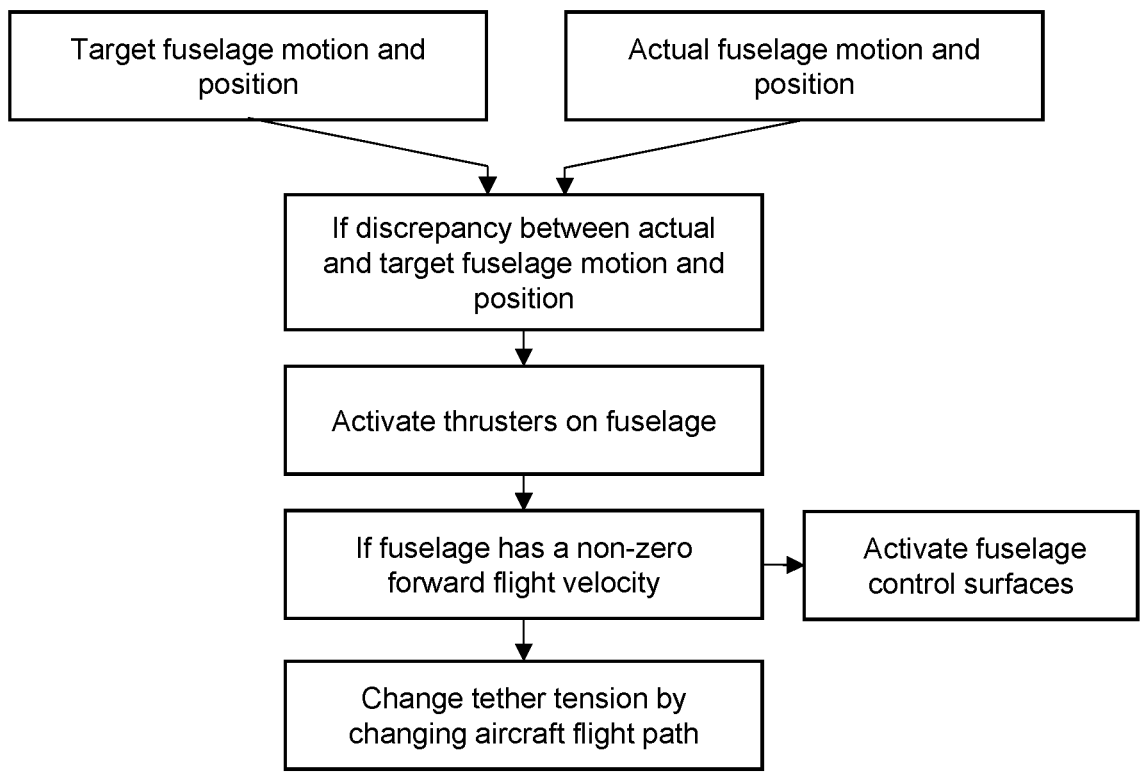
FIG. 36 illustrates, in accordance with at least one embodiment of the invention, a flowchart of the method to limit control the payload motion.

In order to keep the fuselage 50 in a steady motion, the acceleration and angular acceleration are to be zero and the sum of forces and moments are to be zero. When three or more wing structures 22 are used the sum of forces can be equated to zero by only a precise position of the wing structure 22. However, a control response can be slow as the wing structure 22 have a non-zero response time. An exemplary flowchart of thrusters 46 actuation is illustrated in FIG. 36.

Figure 28:
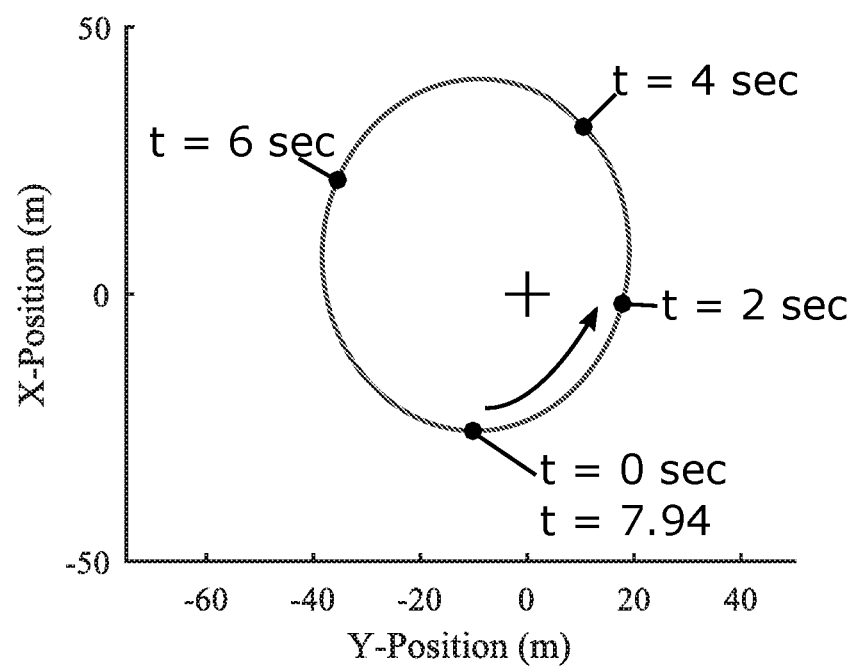
FIG. 28 illustrates, in accordance with at least one embodiment of the invention, a schematic graph of a winged aircraft position over a period of a non-circular flight path.

In the event of an expected external force such as a wind gust, the wing structure 22 and the thrusters 46 can be used together to control the fuselage 50 motion. Because the thrusters 46 are mounted on the fuselage 50 and can provide rapid variations of thrust, they can control very rapidly the fuselage 50 motion. The wing structure 22 take longer to respond because of their mass and because they are separated from the fuselage 50 by the tether 18. Consequently, their motion will generally take longer to affect the fuselage 50 motion. However, they can provide a lot of force and can be more efficient than the use of thrusters 46. This can be exemplified by FIG. 28.

Figure 29:
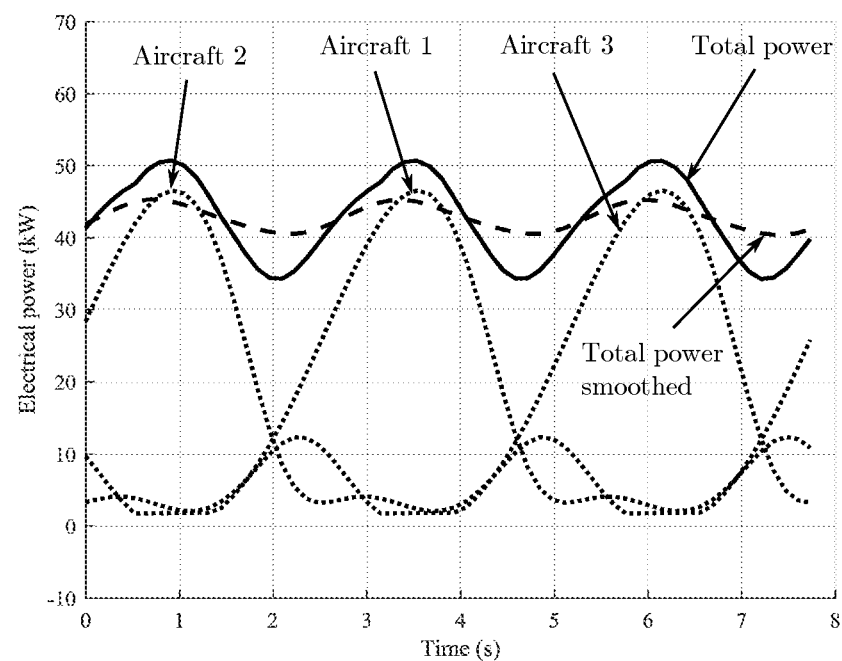
FIG. 29 illustrates, in accordance with at least one embodiment of the invention, the variation in power requirement for the winged aircraft and the total power requirement during hover for each aircraft.

FIG. 29 illustrates variations of required electrical power during hover for each aircraft. The total required power has cyclic variations, which can have negative impact on the performance and operation of the power pack 34. This supports the use of an additional energy storage mechanism, such as the use of capacitor or battery. Depending on various parameters such as the absolute variations of power, the nature of the power pack 34, the electrical property of the tether 18 and the wing structure 22 properties) it can be beneficial to have this external storage unit in the fuselage 50 and/or in the wing structure 22.

Figure 34:
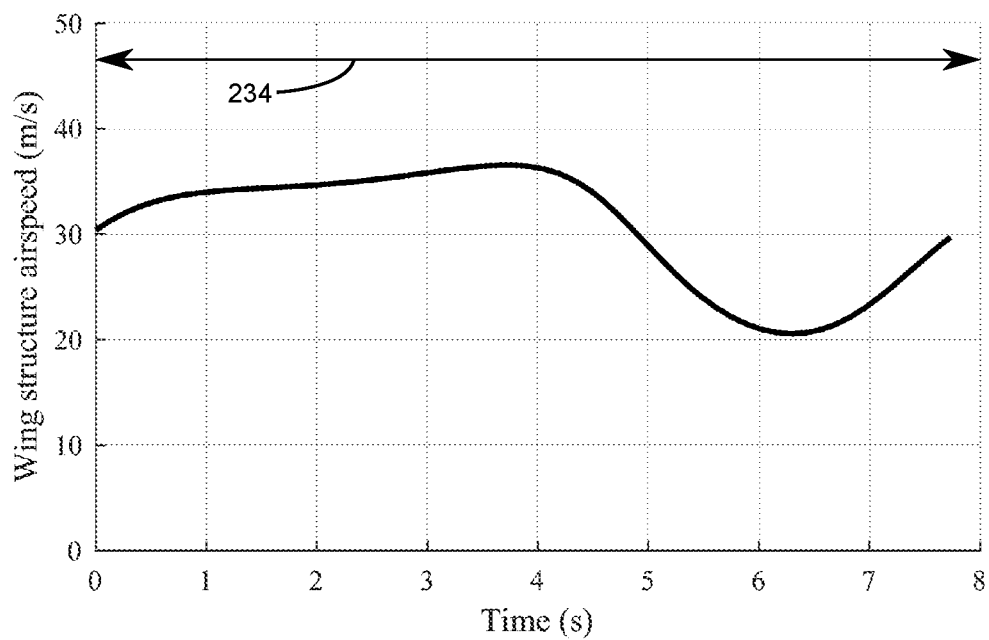
FIG. 34 illustrates, in accordance with at least one embodiment of the invention, a schematic graph of the winged structure airspeed as a function of time during a non-circular flight path in slow flight.
Figure 35:
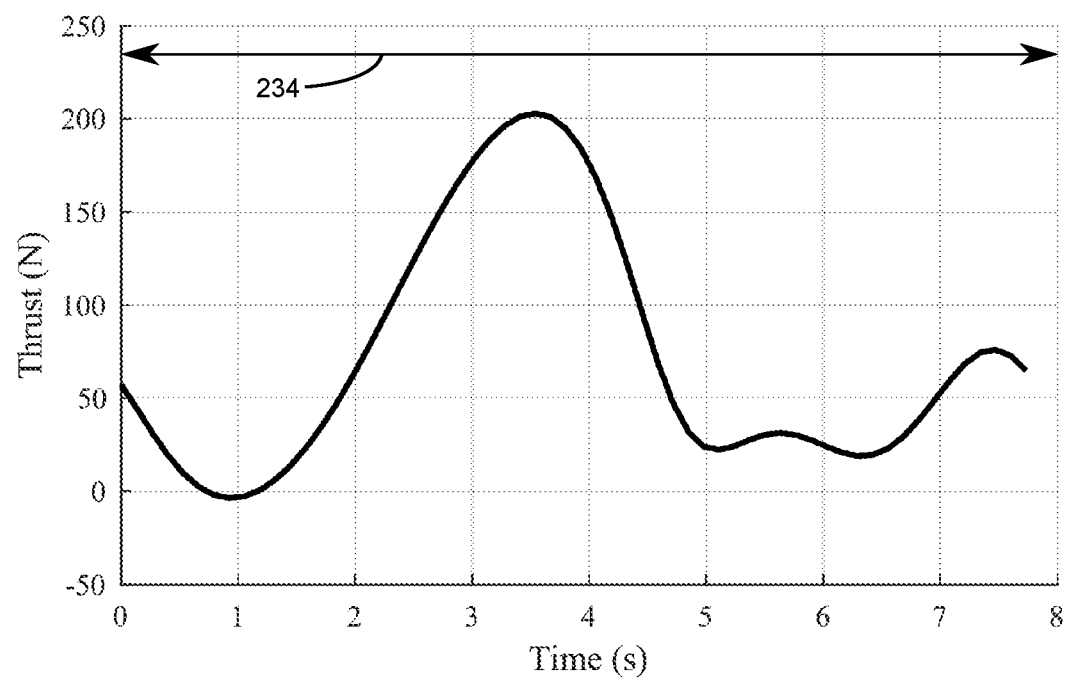
FIG. 35 illustrates, in accordance with at least one embodiment of the invention, a schematic graph of the thrust requirement for a winged structure as a function of time during a non-circular flight path in slow flight.

For each wing structure 22, the thrust requirement varies as a function of time. This is due to the fact that the wing structure 22 accelerates and decelerates and that the lift respectively provided by the wing structures 22 generated varies. For a non-limiting example, FIG. 34 depicts the wing structure airspeed (velocity) variations for one aircraft over a flight path 234 of one revolution above the fuselage 50. One can appreciate the wing structure 22 airspeed (velocity) is creating the lift for each wing structure 22. An exemplary thrust requirement graph is illustrated in FIG. 35 for one wing structure 22 over a flight path 234 of one revolution about the fuselage 50. In the illustrative example, thrust can go from zero (0) N to two hundred (200) N depending on the location of the wing structure over a complete rotation about the fuselage 50. In order to provide the required thrust, the controller in the wing structure 22 command each motors on the wing structure 22 to provide their respective amount of thrust. Control can be provided by a central control unit 58 located in the fuselage 50 in another embodiment. In one other embodiment, a central control unit could be located in a ground station or a remote, using wired or wireless communication with the fuselage 50 and/or the wing structures 22.

Figure 30:
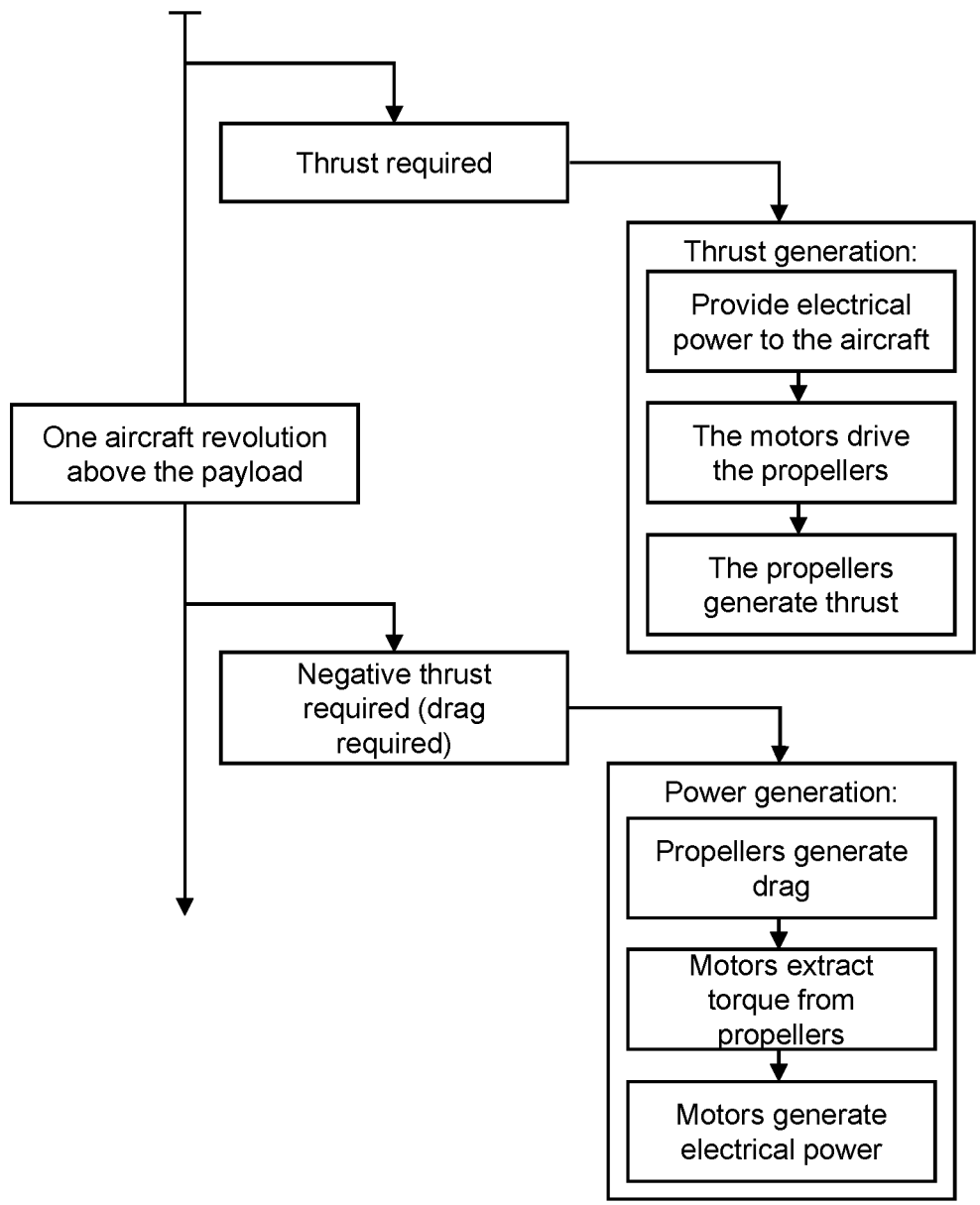
FIG. 30 illustrates, in accordance with at least one embodiment of the invention, a flowchart of the method the power is provided or harvested from the electric motors.
Figure 31:
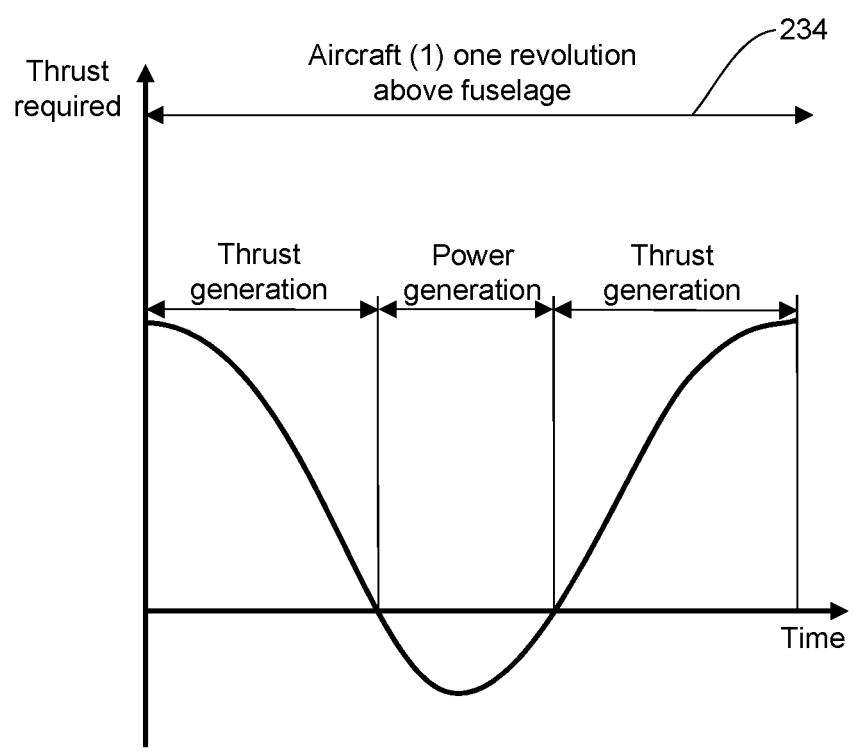
FIG. 31 illustrates, in accordance with at least one embodiment of the invention, a schematic graph of the variation in thrust requirement for a winged structure over a period for a non-circular flight path with a power generation phase.

In some cases, the wing structure 22 needs to decelerate very quickly, and the drag that it generates and the tether tension is enough to slow it down. Consequently, the wing structure 22 needs additional drag mechanisms such as the use of deployable spoilers along the wing. It can also use the thrusters 46 (or propellers) to generate drag and generate power. During this portion of the flight, the thrusters 46 (or propellers) are operating as wind mills and the motors are operated as electric generators as illustrated in FIG. 30. The electrical power generated during this portion of the flight path can either be transferred to the fuselage 50 through the tether 18 to reduce the power requirement on the power pack 34. It can also be sent to the other wing structure(s) 22 through the tethers 18. Finally, the power generated can also be stored on the wing structure 22 itself and be used during the thrust generation portion of the flight phase. An exemplary graph of trust generation vs power generation is illustrated in FIG. 31.

The power requirement for each tethered wing structure 22 varies significantly as a function of time. In forward flight, it was shown that energy can be extracted during some section of the periodic flight path while other sections require a high power requirement. Such variations in electrical power requirement over periods of time in the order of a few seconds cannot be performed efficiently by energy conversion methods, such as a gas turbine driven electric generator. Such devices are more efficient if the power requirement remains approximately constant over time.

To damp those variations, a capacitor 114 can be added with the power pack 34, combined with a battery 118. In this case, the power that must be transmitted to each wing structure 22 still varies greatly over time, but the power requirement variations for the power pack 34 are reduced.

Another alternative is to install a capacitor 114 and/or small battery 118 in each wing structure 22. In this architecture, the power variations in the tether 18 are damped at the wing structure 22 level. The sum of the power requirement to be generated by the gas turbine is therefore damped.

Figure 32:
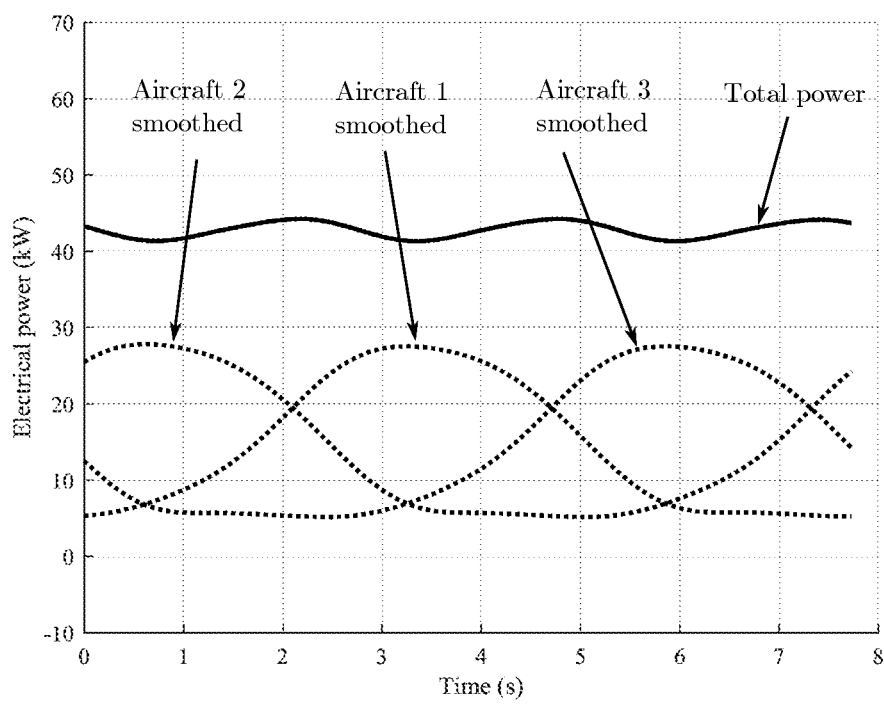
FIG. 32 illustrates, in accordance with at least one embodiment of the invention, the variation in power requirement for the winged aircraft and the total power requirement for one period of a non-circular flight path.

FIG. 29 illustrates the impact of installing an energy storage mechanism such as a battery and/or capacitor on the fuselage. The total required power by the power pack 34 is smoother as a function of time over a full revolution. FIG. 32 illustrates the impact of installing an energy storage mechanism such as a battery and/or capacitor on each wing structure 22. The power required by each wing structure 22 is smoother than in FIG. 32 and the total required power by the power pack 34 is also smoother than without any energy storage mechanism.

Figure 33:
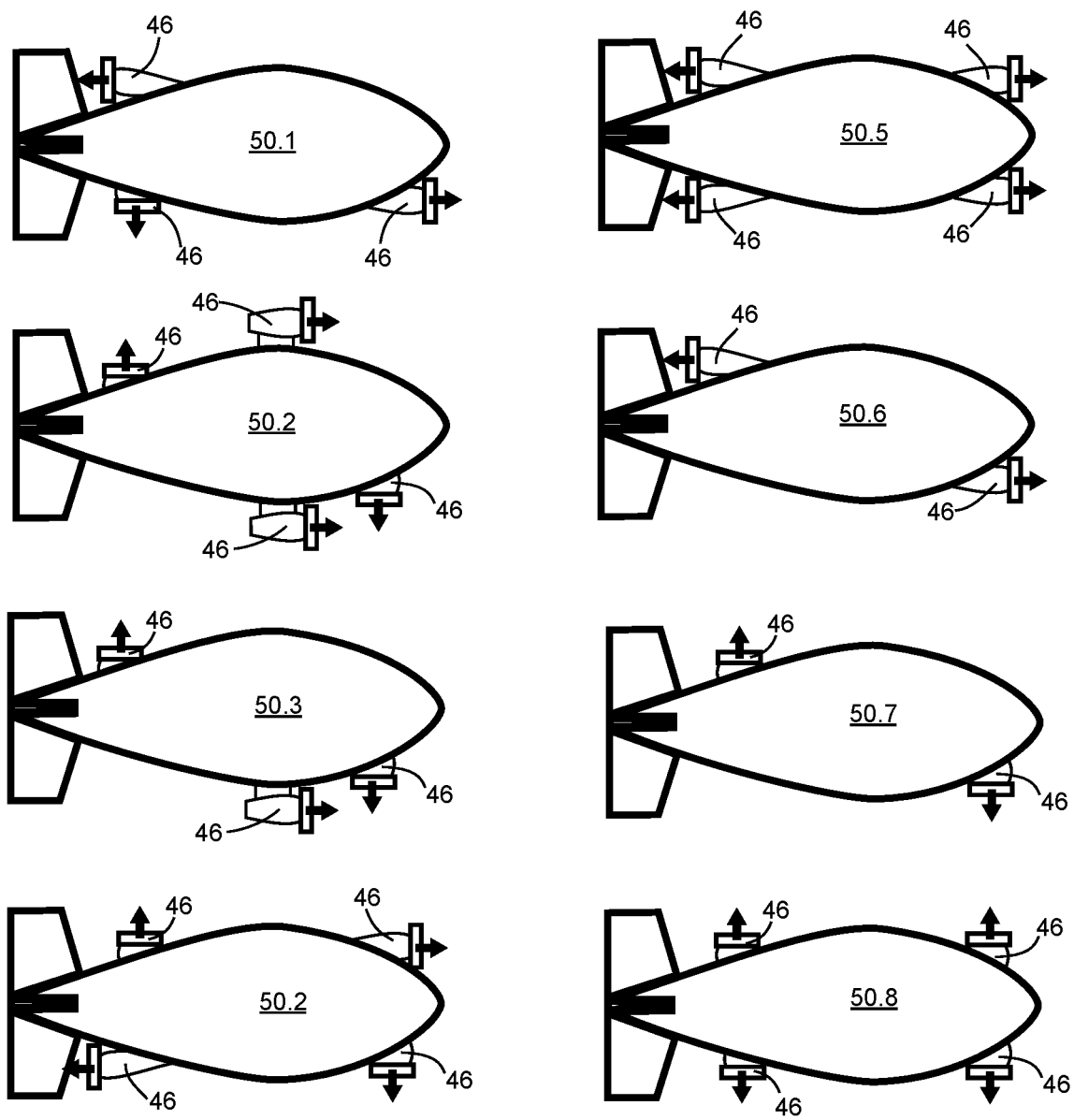
FIG. 33 illustrates, in accordance with at least one embodiment of the invention, notional placement of thrusters on the fuselage.

FIG. 33 depicts various thrusters 46 positions on a fuselage 50, in accordance with embodiments of the invention, for propelling the fuselage 50 in various directions from different locations on the fuselage 50.

Figure 37:
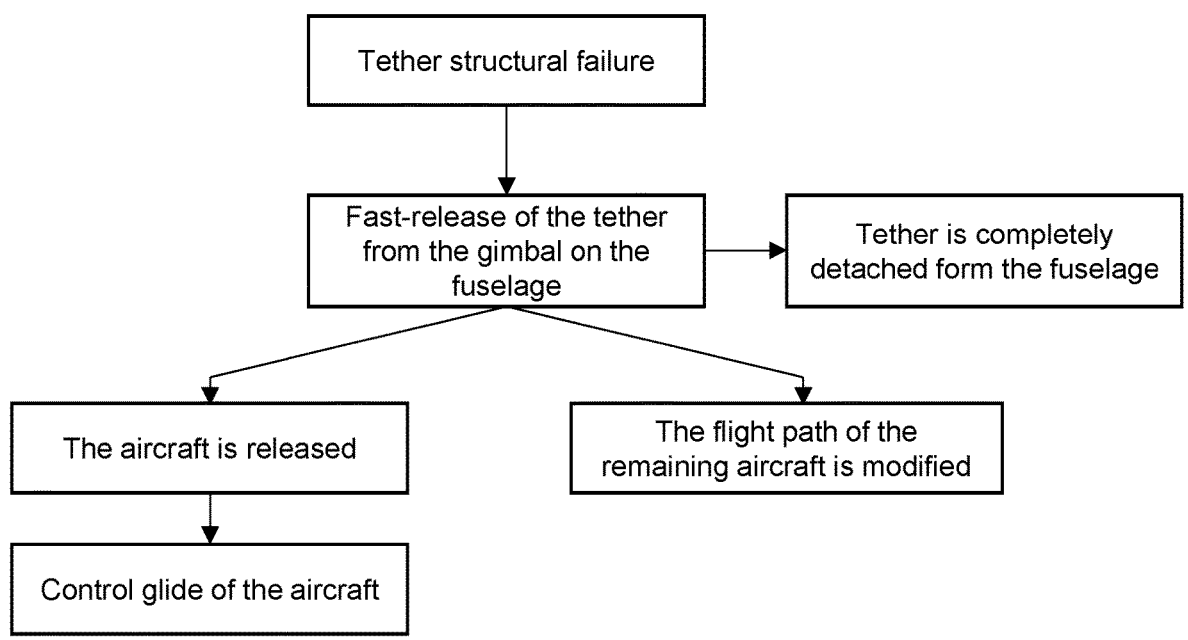
FIG. 37 illustrates, in accordance with at least one embodiment of the invention, a flowchart of the method to operate the system when a tether has a mechanical failure.

FIG. 37 illustrates a flowchart of an exemplary series of steps to operate the system 10 when a tether 18 has a mechanical failure. In the case of a mechanical failure of one of the tethers 18, the system 10 can adapt its parameters to continue its mission or fly safely back to the ground. This is done by first releasing (disconnecting) completely the broken tether 18 from the attachment point (connector 52) on the fuselage 50 through a fast-release mechanism 48 on the gimbal 56. The released wing structure 22 uses the energy stored onboard to safely fly or glide back to the ground. The remaining wing structures 22 connected to the fuselage 50 are adapting to the new system and change their flight parameters such as the speed, the tilt of the flight path, the shape of the flight path and also their distance relative to each other. This can be done to operate the system at the minimum power requirement given the number of wing structures 22.

Figure 38:
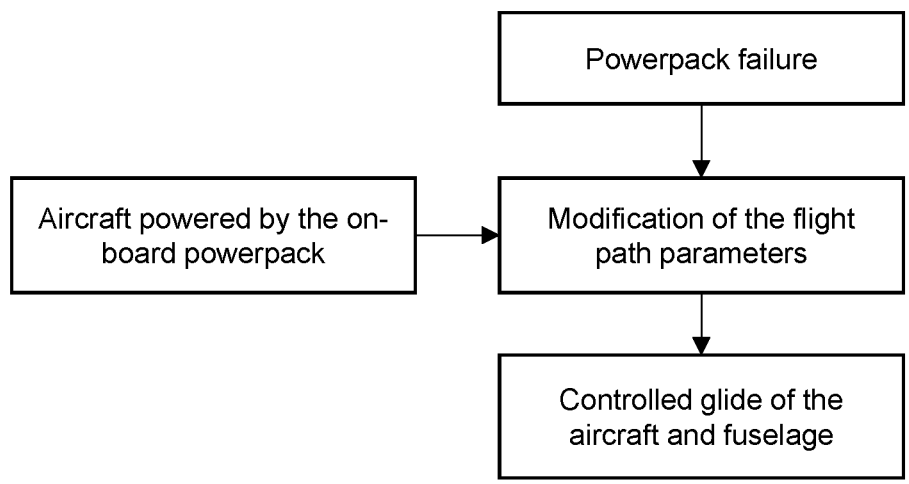
FIG. 38 illustrates, in accordance with at least one embodiment of the invention, a flowchart of the method to operate the system after the failure of the fuselage power pack.

FIG. 38 illustrates a flowchart of the method to operate the system after the failure of the fuselage 50 power pack 34. After a failure of the power pack 34, some energy is still available from the batteries and/or electric capacitors in the wing structures 22 and/or in the fuselage 50. This energy can be used to power the wing structures 22 and/or thrusters of the fuselage 50 for a few seconds to a few minutes. The wing structures 22 can change their flight parameters such as the speed, the tilt of the flight path and the shape of the flight path to fly or glide back to the ground safely. Power extraction can also be used in descent to store energy in the batteries and/or electric capacitors in the wing structure 22 and/or in the fuselage 50 to prepare for landing.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A vertical liftoff aircraft system comprising:
    a plurality of unmanned wing structures configured for collective vertical liftoff;
    a plurality of tethers respectively connected to the plurality of wing structures;
    a fuselage including a connector for mechanically connecting the plurality of tethers, wherein the plurality of wing structures is operatively interconnected to the fuselage with the plurality of tethers for lifting the fuselage, and
    a control unit adapted to periodically change a flight velocity vector and enable a non-circular flight path of the wing structures resulting in an unequal load distribution of the fuselage applied on the tethers.

2. The vertical liftoff aircraft system of claim 1, wherein the fuselage including a power pack for powering the plurality of wing structures via the plurality of tethers and the plurality of wing structures is electrically powered.

3. The vertical liftoff aircraft system of claim 1, wherein the fuselage further includes at least one thruster operatively connected to the control unit.

4. The vertical liftoff aircraft system of claim 1, wherein the control unit is operatively connected to each of the wing structures and is periodically changing the flight velocity vector defined by at least one flight parameter of the wing structures.

5. The vertical liftoff aircraft system of claim 4, wherein the at least one flight parameter is selected from a group consisting of:
    a speed of the wing structure along the flight path;
    a forward tilt of the wing structure overall flight path;
    a sideway tilt of the wing structure overall flight path; and
    a geometry of the flight path.

6. The vertical liftoff aircraft system of claim 1, wherein each of the wing structures includes a control unit adapted to transmit instructions between the fuselage and the plurality of wing structures via the plurality of tethers.

7. The vertical liftoff aircraft system of claim 6, wherein the instructions are enabling a non-circular flight path for each of the wing structures, the non-circular flight path circulating the plurality of wing structures in the non-circular flight path about a vertical non-circular flight path axis virtually extending through the fuselage.

8. The vertical liftoff aircraft system of claim 1, wherein the connector includes a gimbal.

9. The vertical liftoff aircraft system of claim 1, wherein each tether includes power transmission capability and control communication capability.

10. The vertical liftoff aircraft system of claim 1, wherein the plurality of wing structures is three wing structures.

11. A method of operating a vertical liftoff aircraft system, the vertical liftoff aircrafts system comprising:
    a plurality of unmanned wing structures configured for collective vertical liftoff;
    a plurality of tethers respectively connected to the plurality of wing structures;
    a fuselage including a connector for mechanically connecting the plurality of tethers, wherein the plurality of wing structures is operatively interconnected to the fuselage with the plurality of tethers for lifting the fuselage, and
    a control unit adapted to periodically change a flight velocity vector and enable a non-circular flight path of the wing structures resulting in an unequal load distribution of the fuselage applied on the tethers,
    the method comprising:
    vertically disposing the plurality of wing structures;
    lifting off the plurality of wing structures in a vertical direction;
    flying the plurality of wing structures along a non-circular flight path;
    periodically changing a flight velocity vector of the non-circular flight path; and
    lifting airborne the fuselage.

12. The method of claim 11, wherein the fuselage includes a power pack for powering the plurality of wing structures via the plurality of tethers and wherein the plurality of wing structures is electrically powered.

13. The method of claim 11, wherein the fuselage further includes at least one thruster operatively connected to the control unit.

14. The method of claim 11, wherein the control unit is operatively connected to each of the wing structures and periodically changes the flight velocity vector defined by a flight parameter.

15. The method of claim 14, wherein the flight parameter comprises at least one of
a speed of the wing structure along the flight path;
a forward tilt of the wing structure overall flight path;
a sideway tilt of the wing structure overall flight path; and
a geometry of the flight path.

16. The method of claim 11, wherein each of the wing structures includes a control unit adapted to transmit instructions between the fuselage and the plurality of wing structures via the plurality of tethers.

17. The method of claim 16, wherein the instructions result in a non-circular flight path for each of the wing structures, the non-circular flight path circulating the plurality of wing structures in the non-circular flight path about a vertical non-circular flight path axis virtually extending through the fuselage.

18. The method of claim 11, wherein the connector includes a gimbal.

19. The method of claim 11, wherein each tether includes power transmission capability and control communication capability.

20. The method of claim 11, wherein the plurality of wing structures is three wing structures.

* * * * *